United States Patent [19]
Zetts et al.

[11] Patent Number: 5,864,635
[45] Date of Patent: Jan. 26, 1999

[54] DISTINGUISHING GESTURES FROM HANDWRITING IN A PEN BASED COMPUTER BY STROKE ANALYSIS

[75] Inventors: John Mark Zetts, Falls Church, Va.; Maurice Roger Desrosiers, Melbourne, Fla.

[73] Assignee: International Business Machines Corporation, Armonk, N.Y.

[21] Appl. No.: 665,128

[22] Filed: Jun. 14, 1996

[51] Int. Cl.[6] .............................. G06K 9/00; G06K 9/48; G06K 9/72

[52] U.S. Cl. .......................... 382/187; 382/192; 382/198; 382/229

[58] Field of Search ..................................... 382/181, 182, 382/184, 185, 186, 187, 189, 190, 192, 194, 229, 202; 341/144, 155, 358

[56] References Cited

U.S. PATENT DOCUMENTS

| | | | |
|---|---|---|---|
| 4,680,804 | 7/1987 | Kuzunuki et al. | 382/187 |
| 5,252,951 | 10/1993 | Tannenbaum et al. | 345/156 |
| 5,319,747 | 6/1994 | Gerrissen et al. | 395/155 |
| 5,361,310 | 11/1994 | Ishigaki | 382/13 |
| 5,390,281 | 2/1995 | Luciw et al. | 395/12 |
| 5,398,310 | 3/1995 | Tchao et al. | 395/144 |
| 5,404,458 | 4/1995 | Zetts | 395/275 |
| 5,455,901 | 10/1995 | Friend et al. | 395/149 |
| 5,463,696 | 10/1995 | Berrnink et al. | 382/186 |
| 5,517,578 | 5/1996 | Altman et al. | 382/187 |
| 5,566,248 | 10/1996 | Ulrich | 382/187 |
| 5,592,566 | 1/1997 | Pagallo et al. | 382/187 |
| 5,594,810 | 1/1997 | Gourdol | 382/187 |
| 5,602,570 | 2/1997 | Capps et al. | 382/189 |
| 5,682,439 | 10/1997 | Beernink et al. | 382/187 |

*Primary Examiner*—Bipin Shalwala
*Attorney, Agent, or Firm*—Jeffrey S. LaBaw

[57] ABSTRACT

Pre-recognition analysis on stroke characteristics such as the count, size and position of each stroke in real-time as it is drawn improves recognition accuracy. After each stroke, the set of strokes is weighted toward handwriting or gesture. The system uses a gesture threshold size to distinguish between gestures and handwriting. The system also uses the stroke count to distinguish between the two inputs, relying on the knowledge of the allowable number of strokes in a gesture. The count information may also be used in conjunction with the stroke size information to weight the set of strokes between gestures handwriting. Once the stroke size crosses a gesture vs. text size threshold, the result is weighted toward gestures. By examining the 'white space' between strokes and the juxtaposition of the strokes, a gesture vs. text determination can be made with high accuracy.

31 Claims, 43 Drawing Sheets

Gestures
1 Stroke
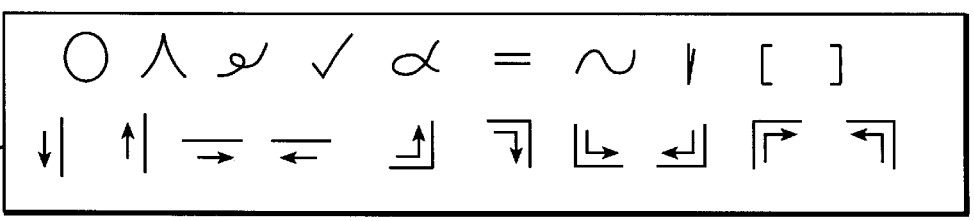
2 Stroke
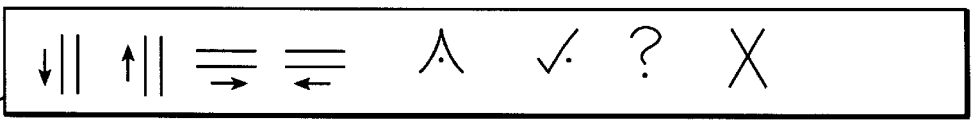
3 Stroke
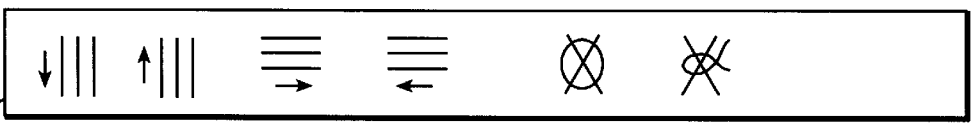
Symbol Gestures
2 Stroke
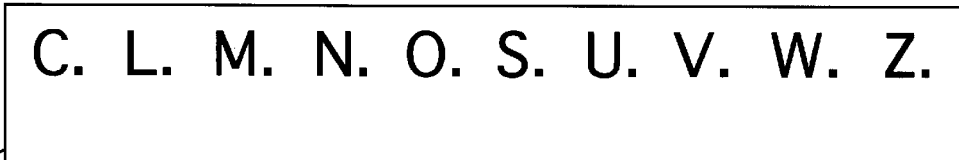
3 Stroke
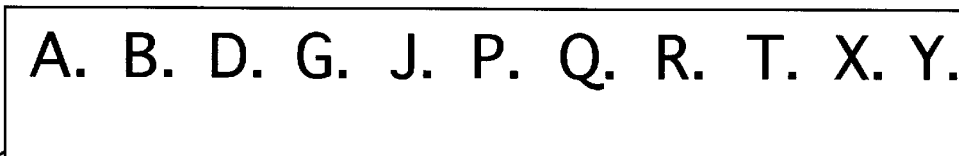
4 Stroke
5 Stroke
Letter Gestures
FIG. 3A

Ambiguous Gestures

| Gesture Symbol | Letter/Number |
|---|---|
| ○ | O, o, 0 (zero) |
| ∝ | a |
| ↓\| | 1, l, I (Cap i) |
| X | X, x |
| [ | C, c |
| ⋀ | A |
| ⌊→ | L |
| ℯ | e |
| ✓ | / |
| ? | ? |

FIG. 3B

Bounding Box Scoring

| Stroke | Isolated Rectangles | BBox Score | Gesture Threshold Size |
|---|---|---|---|
| 400 | 420 | Unknown — 401 | 440 |
| 405 | 425, 436 | Text — 402 | |
| 410 | 430 | Text — 403 | |
| 415, 408 | 435, 437 | Unknown — 404 | |

Result = H. text string

| | | | |
|---|---|---|---|
| 450 | 465 | Gesture — 451 | 480 |
| 455, 456 | 468, 469 | Gesture — 452 | |
| 460, 461 | 470, 471, 462, 472 | Text — 452 | |

Result = lbs text string

FIG. 4A

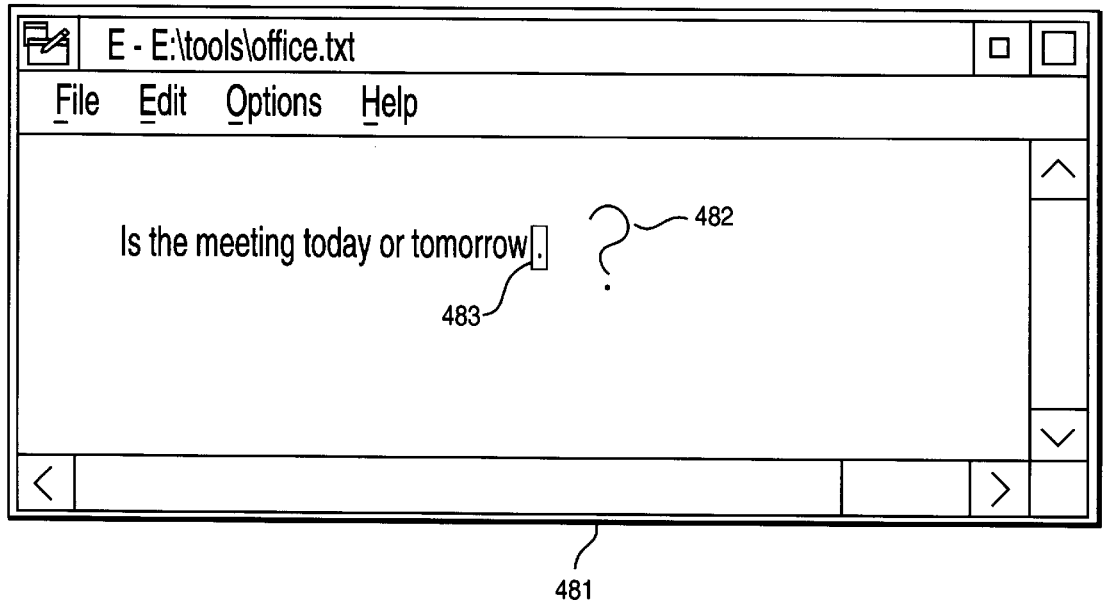
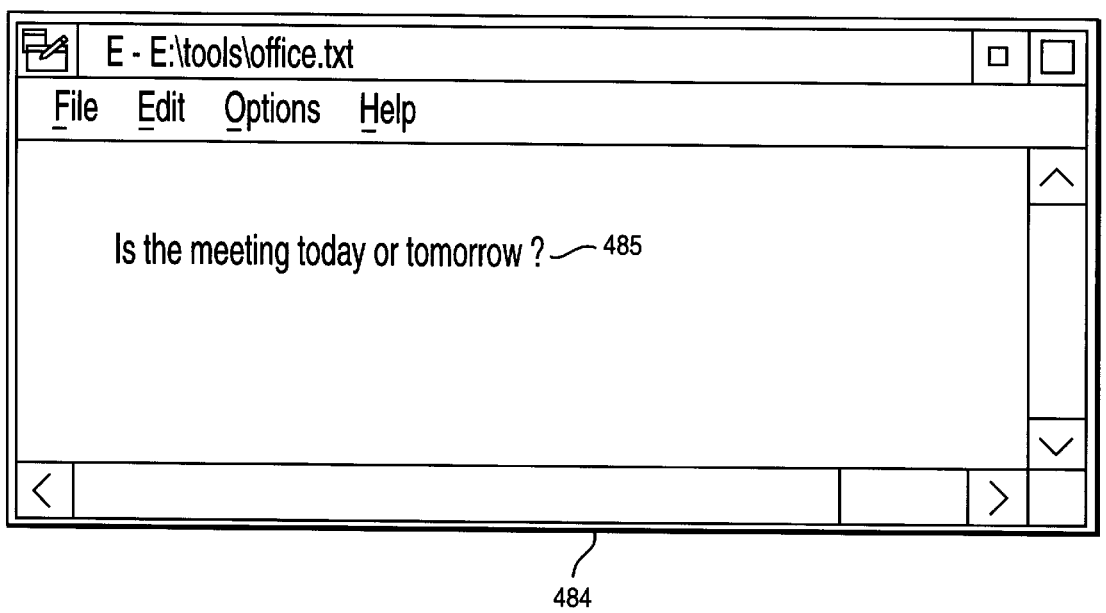
FIG. 4B

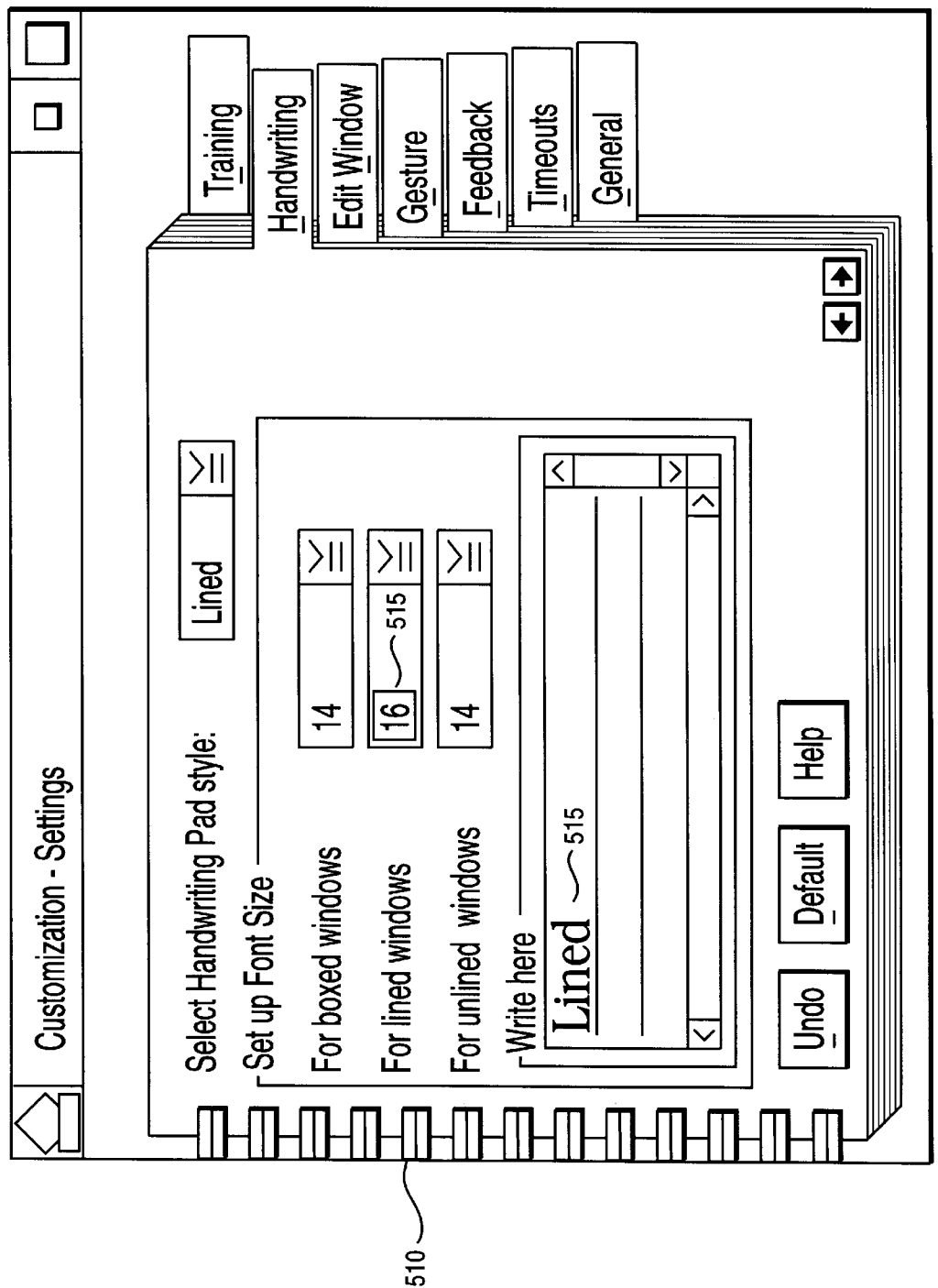

Text Characters
Upper loops
Lower loops
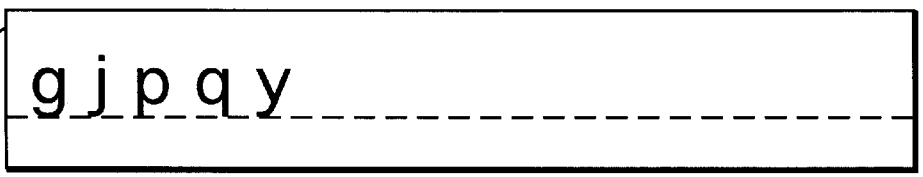
Lower Case
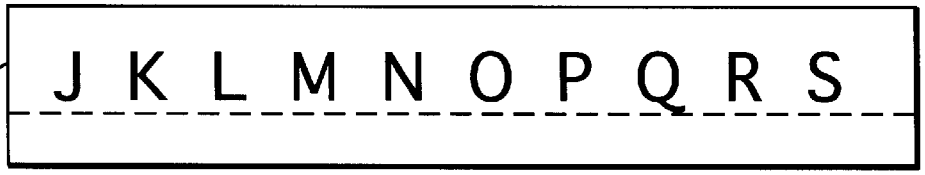
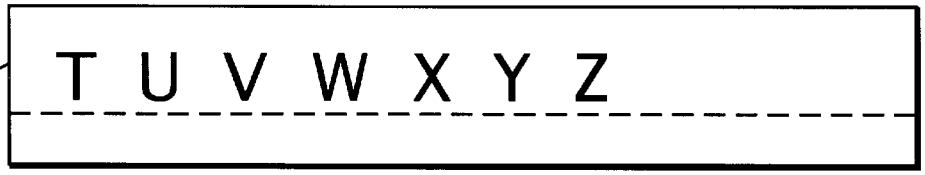
Upper Case
FIG. 26

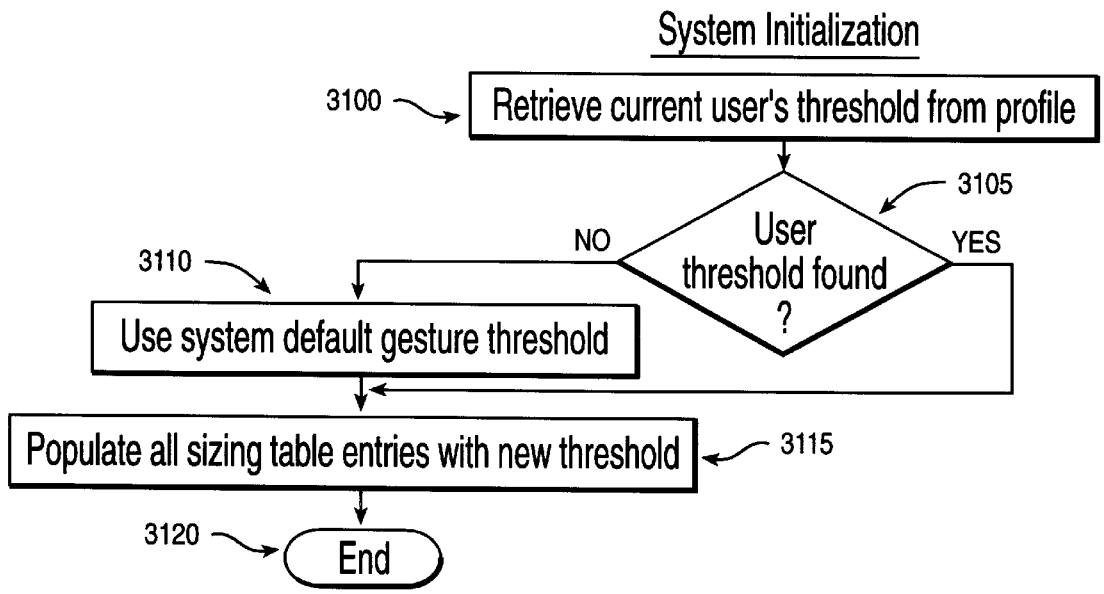
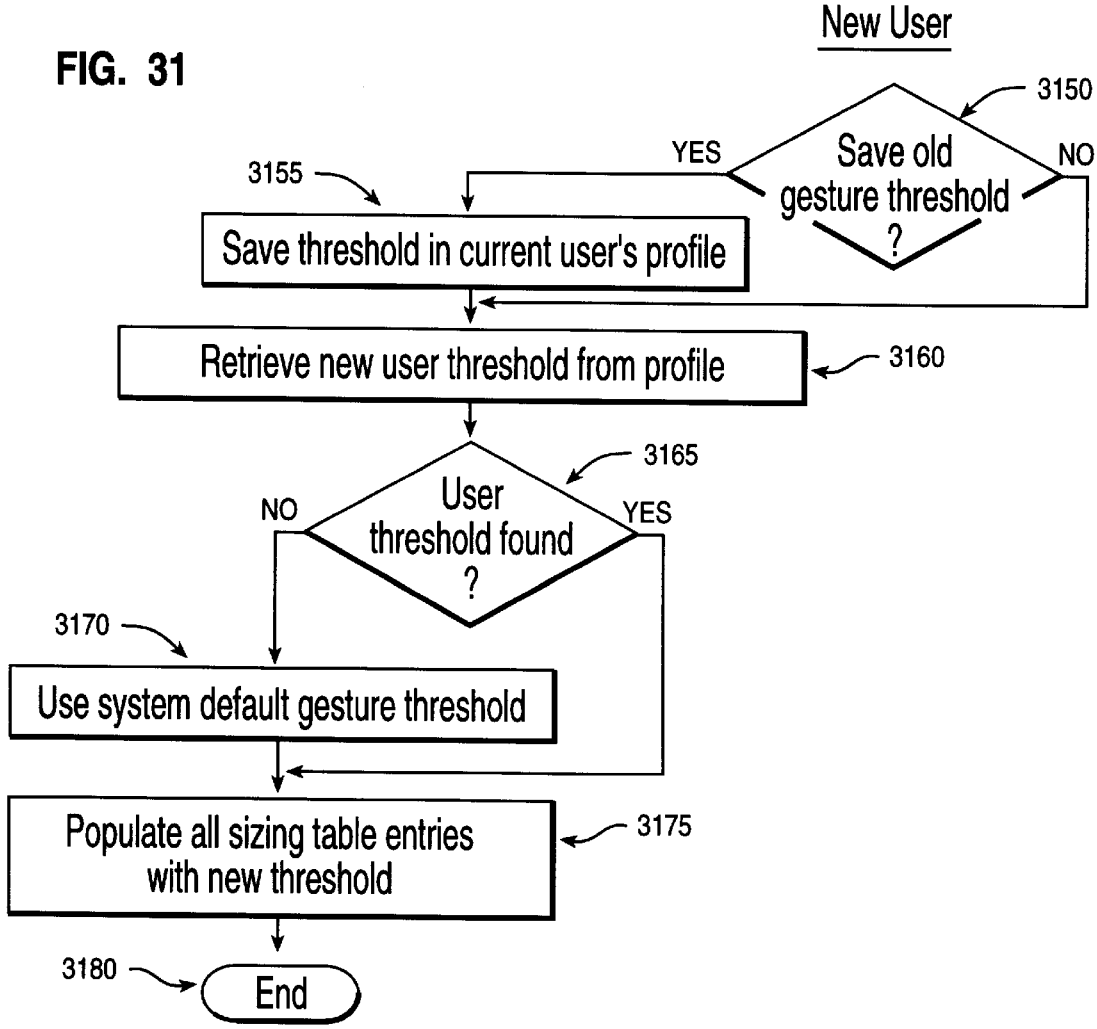
FIG. 31

FIG. 32

E - Untitled

File  Edit  Options  Help

June 6, 1996

John,

The fastest route from National Airport is the George Washington Parkway to I-495 North into Maryland. It's 4 miles to the I-270 split. Have a safe trip.

Regards,
Sam

PS. Be sure to reserve a car. |

Call — 3210
at — 3220
least — 3230
two — 3240
days — 3250
in — 3260
advance — 3270

— 3200

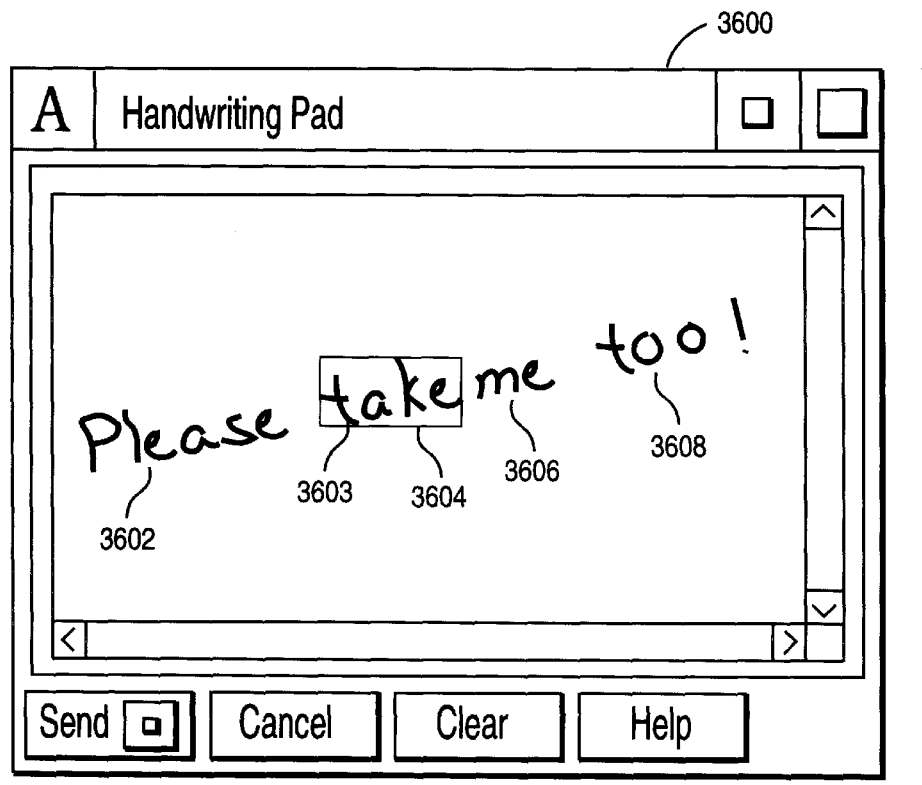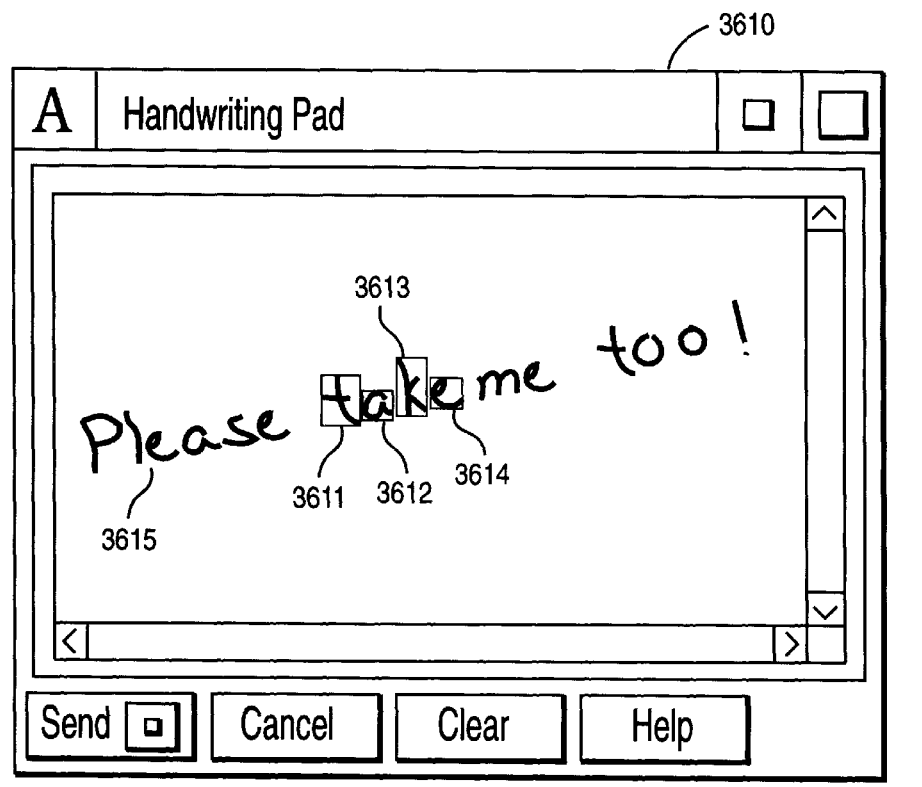
FIG. 36

DISTINGUISHING GESTURES FROM HANDWRITING IN A PEN BASED COMPUTER BY STROKE ANALYSIS

BACKGROUND OF THE INVENTION

The invention broadly relates to data processing systems. The invention has particular application in a multitasking pen computer system in which a user enters hand printed characters and symbols using a stylus to be interpreted as text and gesture commands.

Pen computers are a class of computers that employ a stylus and sensor as an input device. A pen software subsystem, which may be integrated into or an adjunct to the operating system, processes pen input for the purposes of recognizing stylus input as mouse input commands, hand printed characters (text) or hand printed symbols known as gestures. Gestures are typically used to invoke a function such as opening or closing a window.

For example, the pen subsystem of the OS/2 operating system, Pen for OS/2, permits users to write characters directly into a graphical user interface (GUI) window which are subsequently sent to gesture and/or handwriting recognition engines for recognition. One default method of distinguishing between gestures and handwriting is used by the system by treating the hand printed shapes as gestures unless the window is one that accepts text, such as an edit field or a text entry window.

Preferably, the pen operating subsystem will facilitate pen input into all applications that are executed by the computer system, most of which are "unaware" of the stylus input. The typical application program today is written only to accept mouse and keyboard input and is unaware of the function rich programming interface allowed by pen input. To improve ease of use and provide good human factors, it is greatly preferred that the pen subsystem make these pen-unaware applications look and feel, from a user interface point of view, like the applications which are pen-aware and take advantage of the pen functionality.

Pen for OS/2 provides for the recognition of hand drawn shapes as either gesture symbols or as characters (text). Since the advent of pen-computing, designers have struggled to develop recognition engines that accurately recognize both gestures and text. Though tremendous improvements have been realized, even state of the art recognition engines still have problems distinguishing between gestures and text. This is due to the similar shapes of some gestures and some letters. Indeed, unless the system uses highly complex and user unfriendly gestures, because of the range of strokes and shapes in the alphabet and numerals, many of the useful gestures will have some similarity to existing letters.

As an example, any pen operating systems support the circle gesture because of its usefulness. However, if a circle is drawn on top of a word processor window, the system must decide if the user is: 1) drawing a circle gesture, 2) writing a zero, 3) writing an uppercase O, or 4) writing a lower case o? The same ambiguity applies to a single down stroke known as a 'flick down' gesture. Is it a flick down gesture, the letter l, the letter I, or a 1 (one)? There are other examples, but these two suffice to demonstrate the difficulty of distinguishing gestures from text.

The ambiguity of the two examples above can be resolved in many cases by examining the context in which the character was written. In fact, a well written pen application will often resolve it by limiting the input of certain windows to numerals, alpha characters, alpha-numeric characters, or gestures only. Known as recognition constraining, limiting the possible results of the recognition engine significantly increases recognition accuracy. Another common technique of pen designers is to build a library of gesture shapes that are unlike any letter of the alphabet or digit. Unfortunately, this eliminates important gestures like circle, down flick, caret, down-left, X and question mark. Each of these gestures are intuitive, memorable and easily drawn and eliminating them would hurt usability. Pen For OS/2 users can write a question mark gesture on any window to bring up a help window. A problem exists when editing a memo; how could the user change a period to a question mark without having help pop up? In Pen for OS/2, any window that accepts keyboard input is enabled for both gesture and text recognition. Because the pen subsystem is largely unaware of the application environment, it is very difficult to distinguish gestures and text by context. Windows that do not accept text in pen aware applications do not have this problem because they are constrained to gesture only recognition.

Also worth noting is that Pen For OS/2 supports 26 letter gestures where the letter gesture is drawn by writing the upper case letter followed by a period or 'tap'. The tap is the distinguishing feature between letter gestures and normal letters. However, in some cases, the tap introduces ambiguity: i.e. is it an upper/lower case letter and period?

One serious useability problem that persists is that users sometimes get different results after writing what seems to be the exact same character. This inability of the user to predict or control the recognition results leads to high levels of frustration and reduced productivity. Unfortunately, the prior art techniques that heavily constrain recognition and constrain recognition to a smaller subset of characters and symbols only are effective in certain situations, i.e. when properly designed into a pen aware application. For general, commonly used applications which are not pen aware, the user is hindered by the inability of the prior art to predictably distinguish between gestures and handwriting.

The present invention is an improvement over the prior art for distinguishing gesture input from handwriting input.

SUMMARY OF THE INVENTION

An object of the invention is to present the user with a small set of very simple rules that allow the user to know in advance how the system will treat or recognize stroke input.

The present invention seeks to improve recognition accuracy by performing pre-recognition analysis on stroke characteristics such as the count, size and position of each stroke in real-time as it is drawn. After each stroke, the set of strokes is weighted toward handwriting or gesture. The system uses a gesture threshold size to distinguish between gestures and handwriting. The system also uses the stroke count to distinguish between the two inputs, relying on the knowledge of the allowable number of strokes in a gesture. The count information may also be used in conjunction with the stroke size information to weight the set of strokes between gestures handwriting. Once the stroke size crosses a gesture vs. text size threshold, the result is weighted toward gestures. By examining the 'white space' between strokes and the juxtaposition of the strokes, a gesture vs. text determination can be made with high accuracy.

BRIEF DESCRIPTION OF THE DRAWINGS

These and other objects in the features of the invention will be better understood by reference to the attached drawings and the following descriptions.

FIG. 3A shows some of the symbol and letter gestures available to a pen-based input device in a preferred embodiment of the present invention.

FIG. 3B illustrates some of the gestures which may be confused with a letter in handwriting recognition.

FIGS. 4A, 4B and 4C depict the concept of bounding box scoring to distinguish between handwriting and gestures.

FIG. 26 illustrates a hand drawn alphabet.

FIGS. 27–31 are a diagrams of the preferred embodiment of the present invention.

FIG. 32 depicts an edit window with handwriting that has the bounding box of each recognized word displayed.

FIG. 36 shows a handwriting pad in unlined mode in an alternate embodiment of the present invention where because of the slanted baseline, the average character height is computed by using the bounding box of each character in the word.

DETAILED DESCRIPTION OF THE PREFERRED EMBODIMENT

The invention may be run on a variety of computers or collection of computers under a number of different operating systems equipped with a suitable pen input recognition subsystem. The computer could be, for example, a personal computer, a mini computer, mainframe computer or a computer running in a distributed network of other computers. Although the specific choice of computer is limited only by disk and disk storage requirements, it is likely that computers in the IBM PC series of computers could be used in the present invention. For additional information on IBM's PC series of computers, the reader is referred to *IBM PC 300/700 Series Hardware Maintenance* Publication No. S83G-7789-03 and *User's Handbook IBM PC Series* 300 *and* 700 Publication No. S83G-9822-00. The IBM Corporation offers the ThinkPad 750P which is equipped with an unfettered stylus for pen input. One operating system which an IBM personal computer may run is IBM's OS/2 Warp 3.0. For more information on the IBM OS/2 Warp 3.0 Operating System, the reader is referred to *OS/2 Warp V3 Technical Library* Publication No. GBOF-7116-00. As mentioned above, OS/2 offers a pen subsystem, *Pen for OS/2 Warp*, Version 1.03, part no. 25H7380 which can be ordered from the IBM Corporation.

Figure 1:
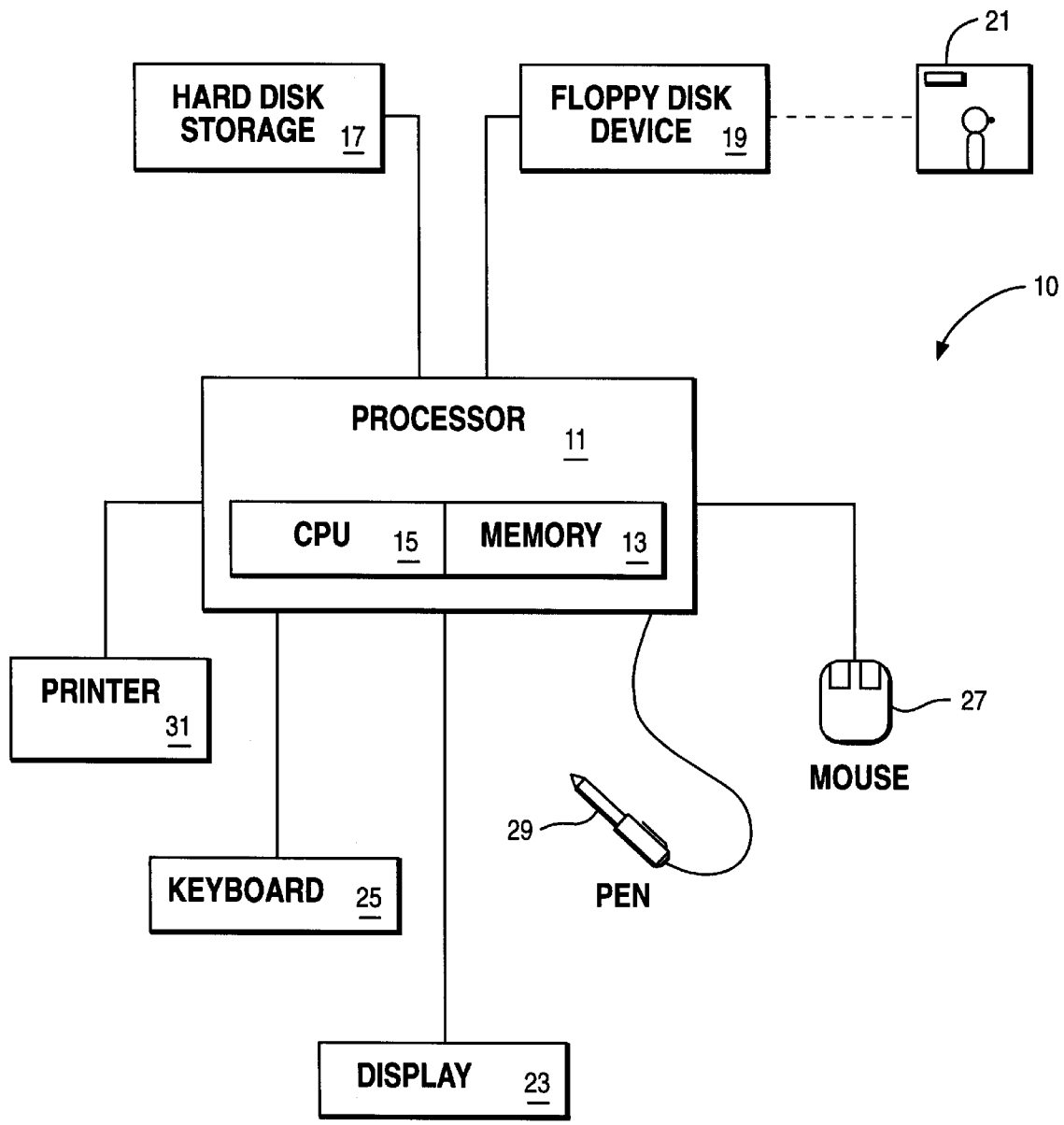
FIG. 1 is a hardware block diagram of a computer system according to the present invention.

Referring now to the drawings, and first FIG. 1, a hardware block diagram of a personal computer system in which the present invention may be implemented is designated generally by the numeral 10. System 10 includes processor 11, which includes a central processing unit (CPU) 13 and random access memory 15. System 10 preferably also includes additional memory in the form of a hard disk storage device 17 and a floppy disk device 19. Floppy disk device 19 is adapted to receive a diskette 21 on which may be recorded software for programs, including a software implementation of the present invention. System 10 also includes user interface hardware devices including a display 23, a keyboard 25, a mouse 27, and a pen or stylus 29. System 10 preferably includes a printer 31.

The actual detection of stylus or finger position with respect to the surface of a touch sensitive surface is outside the purview of this invention. There are a number of touch sensitive devices known to the art which use pressure, infrared or visible light, sound, electromagnetic or electrostatic forces to sense stylus position which may be utilized to carry out the present invention. Further, information on the operation of a stylus and stylus sensing device may be found in U.S. Pat. No. 5,252,951 by Alan Tannenbaum et al. entitled "Graphical User Interface with Gesture Recognition in a Multi-Application Environment", assigned to the IBM Corporation and incorporated herein by reference. Information on sensing stylus motion is found in U.S. Pat. No. 5,404,458 by John M. Zetts entitled, "Recognizing the Cessation of Motion of a Pointing Device on a Display By Comparing a Group of Signals to an Anchor Point", assigned to the IBM Corporation and incorporated herein by reference.

One of the preferred implementations of the invention is as sets of instructions resident in the random access memory of a computer system configured generally as described above. Until required by the computer system, the set of instructions may be stored in another computer memory, for example, in the hard disk drive, or in a removable memory such as an optical disk for eventual use in the CD-ROM or in a floppy disk for eventual use in the floppy disk drive. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements. Further, the invention is often described in terms of distinguishing or determining, or other terms that could be associated with a human operator. No action by a human operator is desirable in any of the operations described herein which form part of the present invention; the operations are machine operations processing electrical signals to generate other electrical signals.

Figure 2:
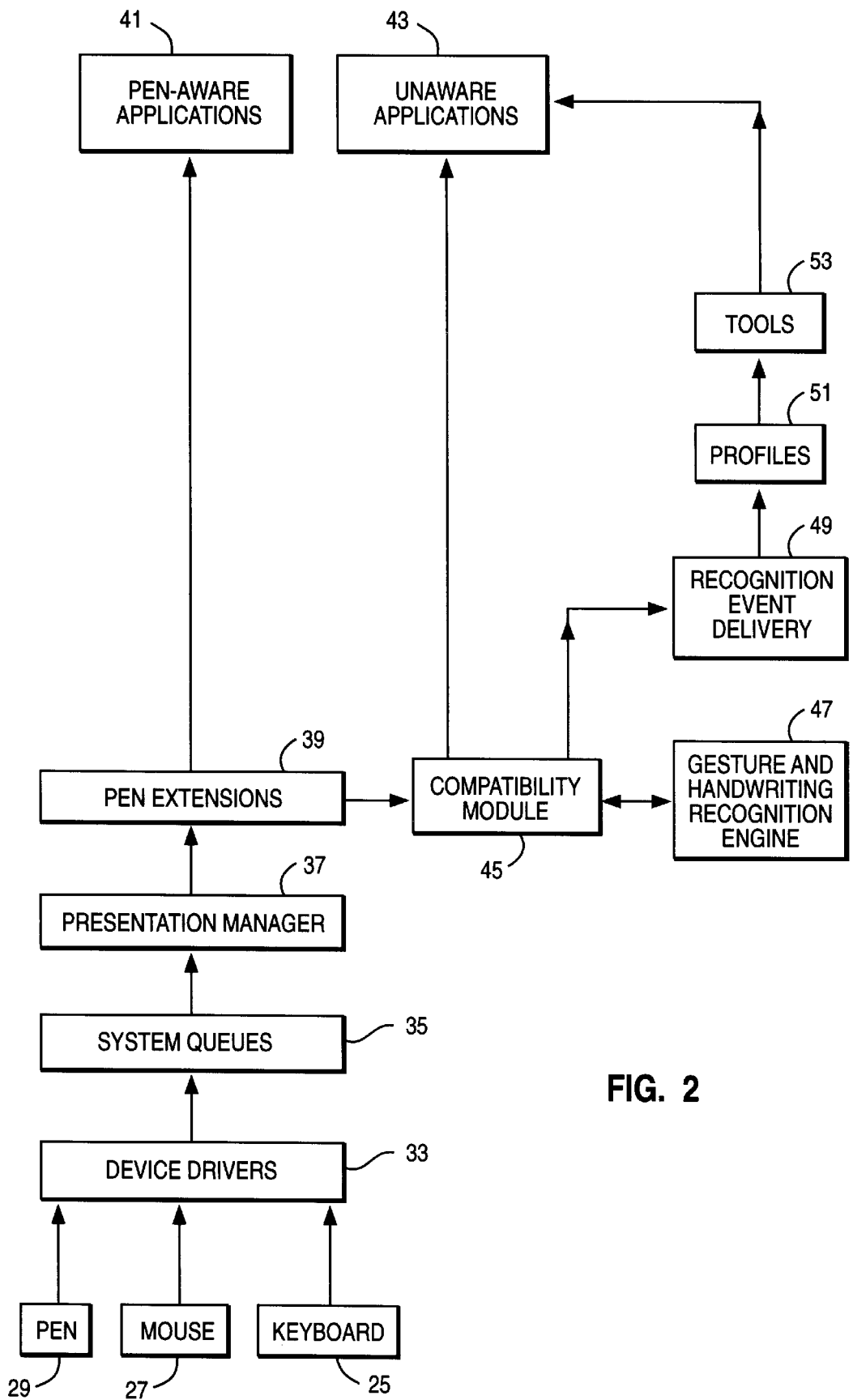
FIG. 2 is architectural block diagram of the major software components of the present invention.

Referring now to FIG. 2, there is illustrated a high level diagram of the major software system components of the pen-based system of the present invention. At the bottom of FIG. 2, the output signals from pen 29, mouse 27, and keyboard 25 are connected to device drivers 33, which are modules that provide low-level I/O support to their respective devices. Device drivers 33 place events into system queues 35. The events in system queues 35 are subsequently processed by a presentation manager 37 which then routes pen and mouse events to pen extensions 39 for processing.

A typical computer system configured according to the present invention will operate both pen-aware applications 41 and pen-unaware applications 43. Pen-aware applications have the native capacity to recognize and process pen input; that is, their developers designed the applications to support pen input. Pen-unaware applications are those that do not have the native capacity to recognize pen input, typically they only recognize and process keyboard and/or mouse input. Therefore, the pen extensions 39 to the operating system route pen events directly to pen-aware applications 41. However, since pen-unaware applications 43 are not capable of understanding pen input, the system includes a compatibility module 45.

The compatibility module 45 provides the pen functionality on behalf of pen-unaware applications. If, for example, the user inputs handwritten character events to a pen-unaware application, the pen extensions 39 routes those events to compatibility module 45, which in turn routes all of the pen strokes to the gesture and handwriting recognition engine 47. The gesture and handwriting recognition engine 47 processes the pen stroke events and returns a recognition result to the compatibility module 45.

If the recognition event is a gesture, the compatibility module 45 routes it to a recognition event delivery subsystem 49, which accesses profiles 51 set up for the user to determine what actions to perform in a pen-unaware application in response to a particular gesture. Optionally, some tools 53 may be invoked to perform some action on the pen-unaware application 43. For example, a pop-up keyboard and the handwriting pad are examples of tools that perform some action on or provide input to pen-unaware applications. If the recognition result returned to the compatibility module 45 is recognized as handwriting, the resultant text string is routed directly to the appropriate pen-unaware application 43.

Stroke Analysis

FIG. 3A lists the gesture set for the preferred embodiment according to stroke count. Whereas the symbol gestures 300, 325, 335 have fixed stroke counts, the stroke counts of the letter gestures 342, 353, 365, 370 will vary somewhat depending on how a user happens to write that particular upper case letter. It may be observed that no symbol gesture is comprised of more than 3 strokes and the letter gestures require a minimum of two strokes and a maximum of 5. These stroke count characteristics are taken into account when differentiating between text and gestures. The term "doodle" refers to a collection of strokes drawn by a user during a modal period of stroke input. The modality is ended by either ceasing input for 3 seconds or lifting the stylus away from the sensor. Since no gesture has more than 5 strokes in the preferred embodiment, once a doodle has more than 5 strokes, the recognition result will always be text. One skilled in the art will readily appreciate that given a different set of doodles, different prerecognition rules will be used.

FIG. 3B lists the gesture symbols that are ambiguous to alpha-numeric characters. In one embodiment of the invention, when these gestures are drawn in a window that has a recognition mode of both gestures and text, they will result in text recognition unless the user draws the gesture large with respect to the user's normal handwriting size.

The concept of bounding box scoring is demonstrated in FIG. 4A. Objects 400, 405, 410 and 415 illustrate the sequence of writing an upper case H and period. As the user draws each stroke, a bounding box associated with each stroke is examined for "isolation". A stroke is "isolated" if it is more than a prescribed distance from another stroke. When strokes touch each other, their bounding boxes are combined as seen in the sequence of objects 420, 425, 436, and 430. Upon completion of each stroke, a score is rendered which classifies the current doodle, based on stroke count, stroke size, stroke isolation and stroke type, as either a gesture or text. If the classification is indeterminate, a score of "unknown" may be given. In FIG. 4A, the H. starts out as unknown 401, then transitions to text 402 and 403. On the final stroke, a tap 408, holds out the possibility for a letter gesture so it is scored as unknown 404.

In one preferred embodiment, whenever a doodle is given a score of unknown, the doodle is sent to both the gesture and the text recognition engines for recognition. The recognition engine will produce two results, one for the best text match and one for the best match gesture and will make the text result the primary recognition result. For the user to make an H tap gesture with the gesture result as primary, the strokes comprising the H must be drawn larger than the gesture threshold. Setting the gesture threshold is a separate invention and is discussed below in the gesture threshold section.

In the second example in FIG. 4A, 'lbs' is written in large strokes that exceed the gesture threshold 480, so the first two strokes 450 and 456 are scored as gestures 451 and 452. However because the last stroke 462 does not exceed the gesture threshold, the score is changed to text 453. Since the last stroke 462 is not a tap, the doodle can not be a letter gesture and examining the 3 stroke gestures 335, it can be seen that all three strokes must be large to qualify as a three stroke gesture. This demonstrates that the user is not prohibited from writing large in all cases.

Figure 4C:
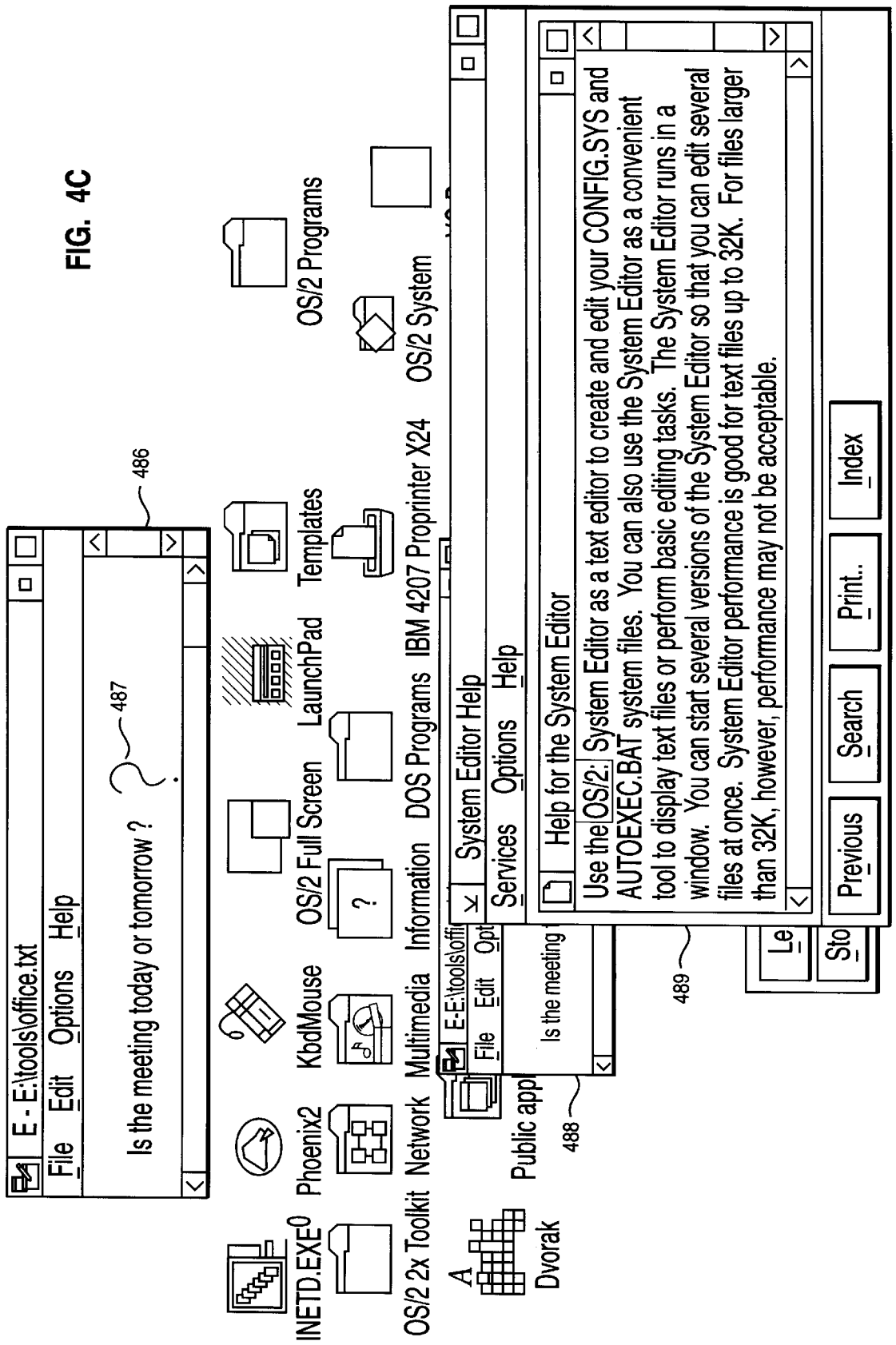

FIGS. 4B and 4C further illustrate how a user can control recognition results by drawing larger than the gesture threshold. The question mark 482 in window 481 is meant to correct a punctuation error in the interrogative sentence by replacing the period. Since it is written small, it produces a question mark character 485. When later redrawn using larger strokes 487, the present invention scores it as a gesture which gets executed and results in the display of the application help window 489.

Figure 5B:
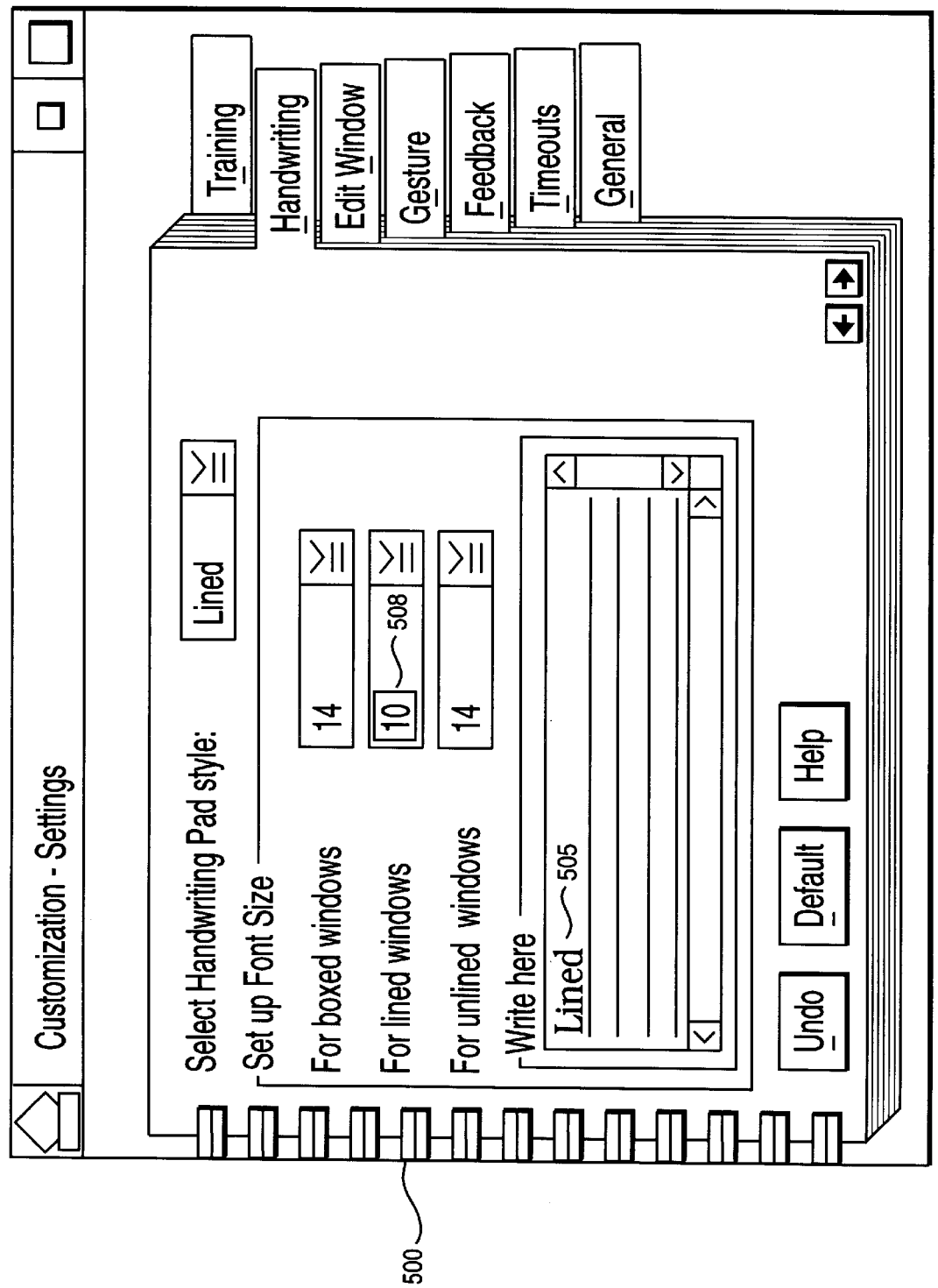
FIG. 5 shows one possible user interface for permitting a user to size the desired handwriting input size.

FIG. 5 shows the end-user interface for setting the lined font size. By setting the font size, the user sets the line spacing used in a line handwriting window. The spacing set by the user is a good indication of a user's normal handwriting size. The height and width are enlarged by 50% and 25% respectively because when writing in an unruled window, there are no lines to constrain the user's handwriting and the handwriting will often be larger than normal. The use of the lined font size in setting the gesture threshold is discussed in greater detail below in the Gesture Threshold section.

Figure 6:
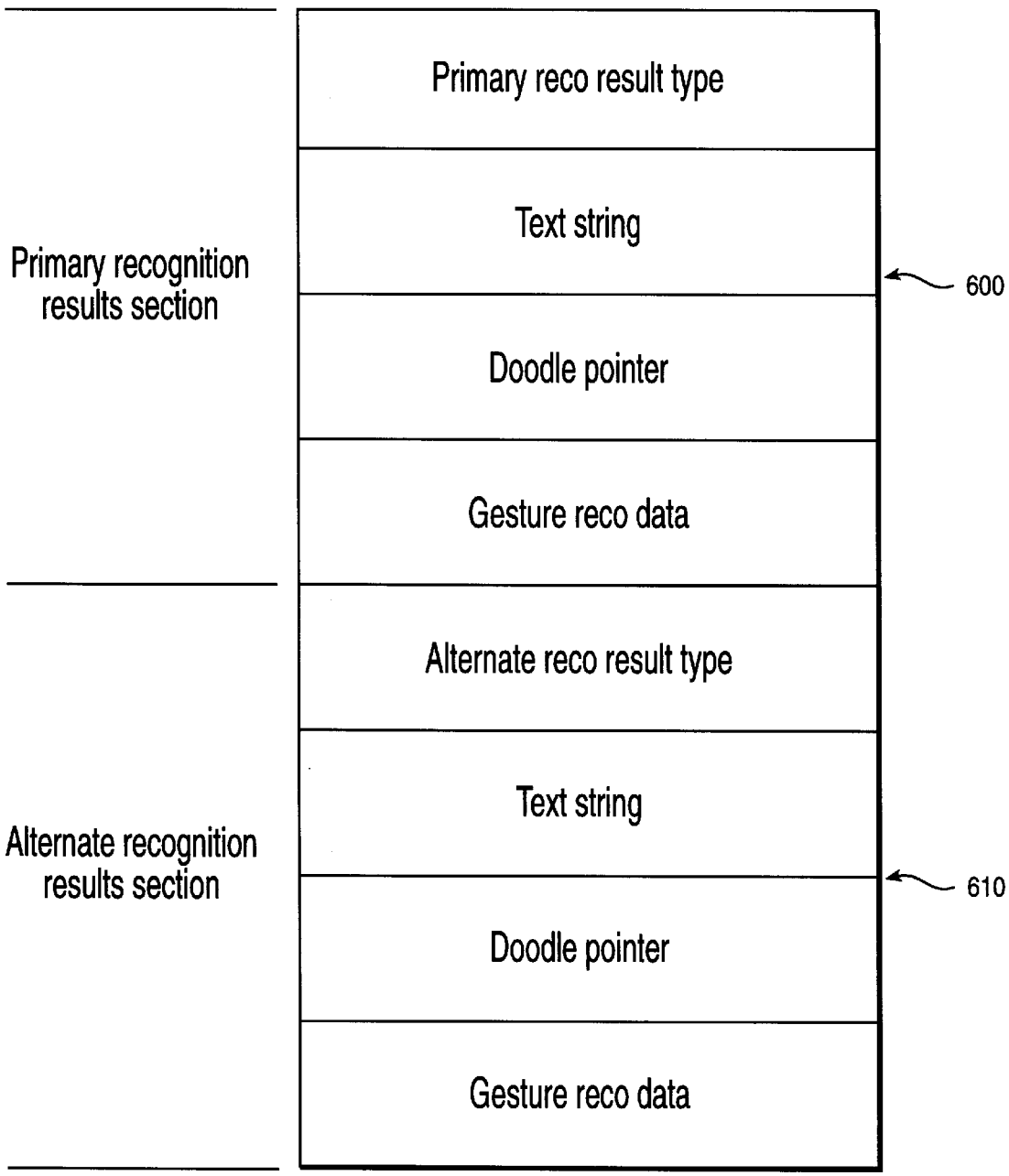
FIG. 6 is the recognition results data structure sent to the application upon completion of gesture and handwriting recognition.

FIG. 6 depicts the recognition results data structure which is built by the pen subsystem and sent to the target application whenever there is a recognition event to report. The recognition handling procedure is depicted in detail in FIG. 12. The data structure is divided into a primary result, 600 and an alternate result, 610 section and although an application is free to act upon either recognition result, the recommended action is for the application to use on the primary result because the system rated that result higher. The primary and alternative recognition result type data fields are filled with gesture and handwriting respectively or handwriting and gesture respectively depending on the results of the prerecognition process. The text string or gesture reco data fields are filled in each section depending on the result type of the section. The doodle pointer is a handle on the set of strokes which comprise the doodle.

Figure 7:
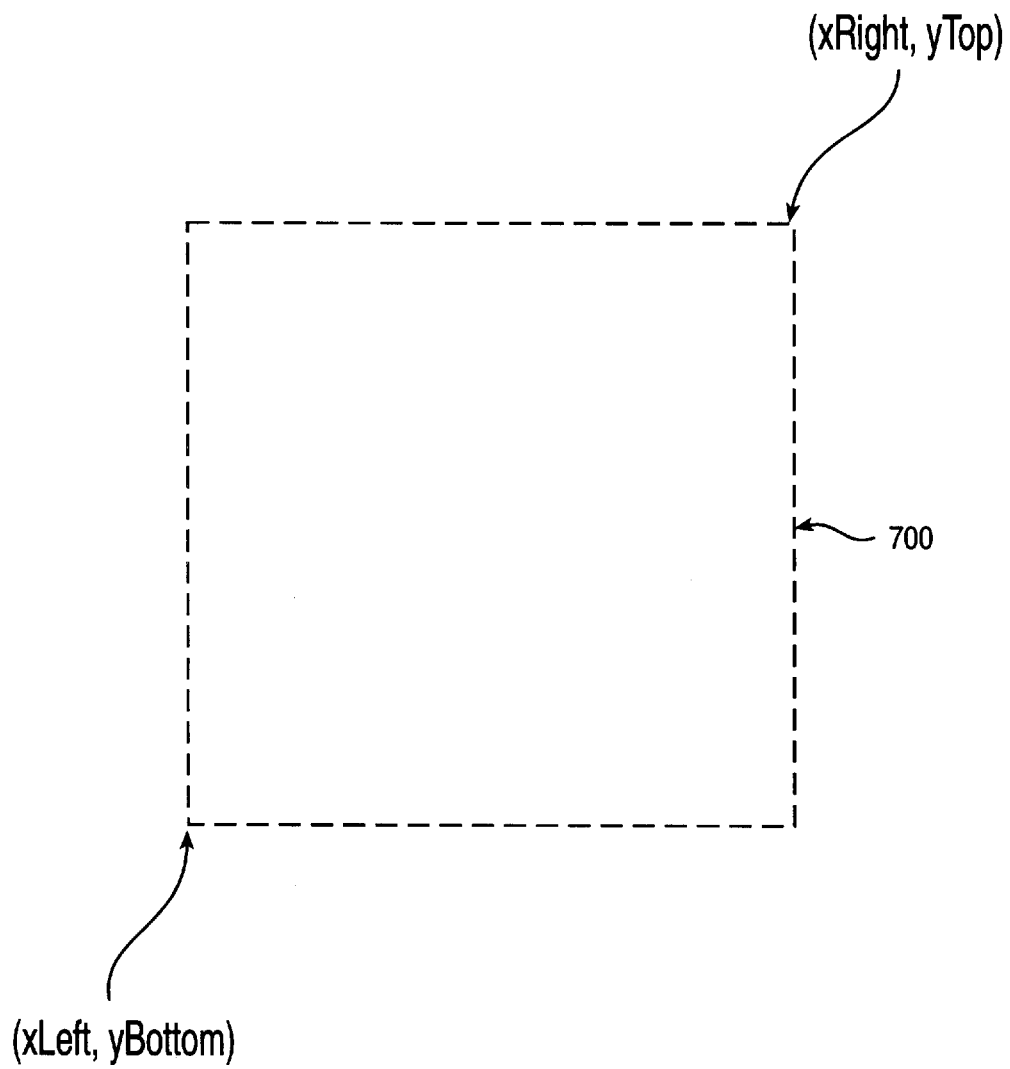
FIG. 7 depicts the bounding box rectangle used in gesture and handwriting recognition in the present invention.

FIG. 7 aids in understanding how a rectangle is inflated by adjusting two Cartesian coordinates, (xLeft and yBottom) and (xRight, yTop), located in opposite corners of the rectangle where (xLeft, yBottom) is also the rectangle's origin point for an upword stroke. The bounding box is created upon the reception of a stroke as described in detail below in connection with FIG. 10 to bound the upper, lower leftmost and right most extent of the stroke. The bounding box is used to test for "isolation" of the stroke as described in greater detail below in reference to FIGS. 20–23. The bounding box is "inflated" by adding 0.02 inch to either side of the box for a total of 0.04 inch. If the bounding boxes of two strokes intersect they are not isolated strokes which is an indication of a gesture rather than handwriting. Text tends to be written horizontally so that isolated strokes are an indication of handwriting.

Figure 8:
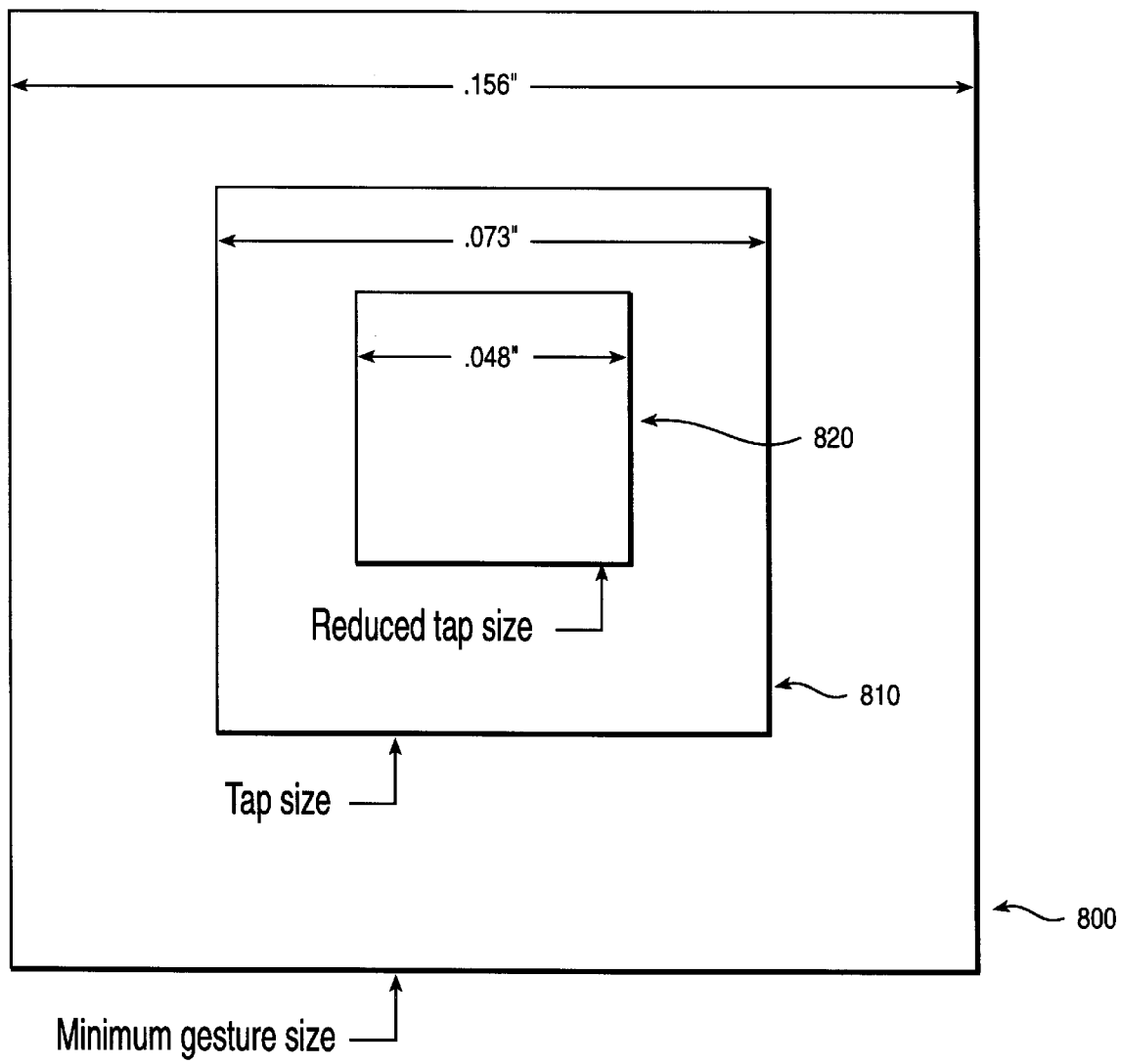
FIG. 8 shows a tap and allowable tap size and minimum gesture size which may be used to distinguish between a letter and a letter gesture in the present invention.

For the present invention to be effective, the applicants have reduced the size of the tap stroke. The prior art tap size 810 is shown in FIG. 8. A pen tap is analogous to a click of a mouse button and it is heavily utilized during selection and window navigation. By defining a large tap size, the user is permitted a small amount of inadvertent movement during the tap. An expanded tap size allows the user to get a little sloppy with taps and it makes it easier to tap quickly (quick taps tend to produce small strokes). However, a side effect of a large tap size is that small characters like commas, quotes, apostrophes all begin to look like taps. Some users have such small handwriting, that their lower case letters like 'o' and 'e' get tagged as tap strokes. Accurately distinguishing taps is a requirement of the present invention, so the invention incorporates a method of reducing the tap size when the recognition mode includes text. The reduced tap size forces the user to tap more carefully, but the resultant care in dotting i's and making periods, colons and semicolons also has the effect of improving text recognition.

The minimum gesture size 800 or gesture threshold in FIG. 8, is typically 0.156 inches and is needed by the system to ensure very small strokes are not interpreted by the system as gestures. When tapping with the stylus, e.g., selection, the user will very often slide the tip of the pen slightly before lifting off. Although the slip of the pen was unintentional, it often results in a stroke that is larger than a tap, in which case the system interprets it not as a tap, but rather a small stroke which is sent to the gesture and text recognition engine. The problem is especially prevalent on pen computers with slippery surfaces on the digitizer. These so called "micro gestures" are problematic so a minimum gesture size is imposed.

Figure 9:
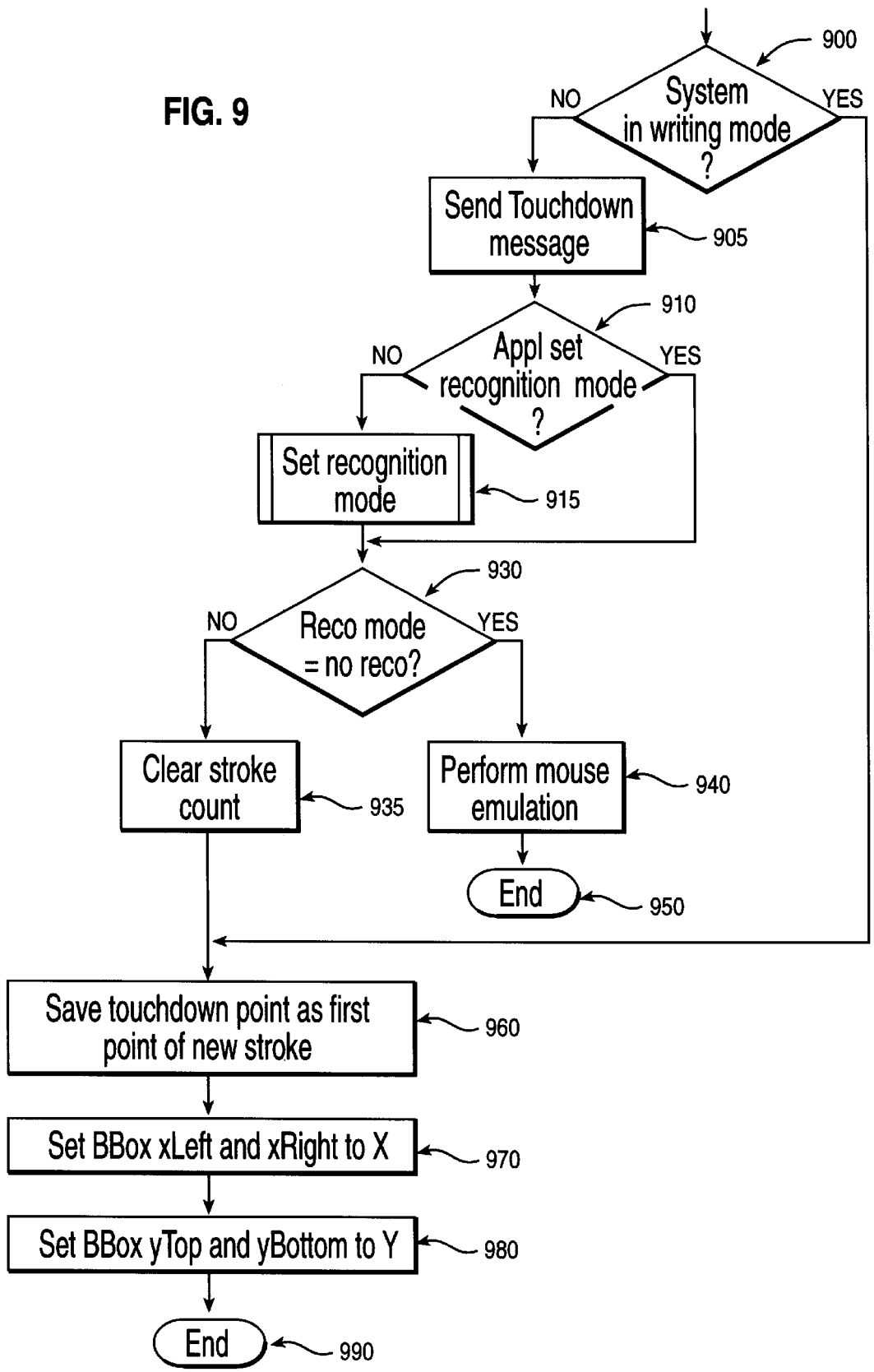
FIG. 9 is a flow diagram of the stylus touchdown and sensing procedure.

FIG. 9 details the logic invoked when the pen subsystem detects the user has touched down with the stylus. A check is made to see if the system had previously been put into in writing mode in step 900. If not, a touchdown message is sent to the application in step 905 to inform it of the touchdown event and allow the application to specify how the event is to be handled. During the handling of this message, an application is permitted to specify the mode of recognition. After sending the message, a test is made to see if the application had set the recognition mode, step 910. If not, a routine is called in step 915 to determine the appropriate recognition mode for the touchdown window. The process then goes through a series of tests detailed in FIG. 11 to determine whether the window has text only, gesture only or text and gesture input. Upon returning to the process depicted in FIG. 9, a test is performed to see if all recognition has been disabled in the touchdown window, step 930. If so, the system simply treats the touchdown event as a mouse button event, step 940, and ends in step 950.

Otherwise, the system prepares for incoming strokes by clearing the stroke count in step 935, saving the touchdown coordinate as the first point of the first stroke in step 960, and initializing the stroke bounding box in steps 970 and 980. The routine then ends, step 990, to await further stylus input.

Figure 10:
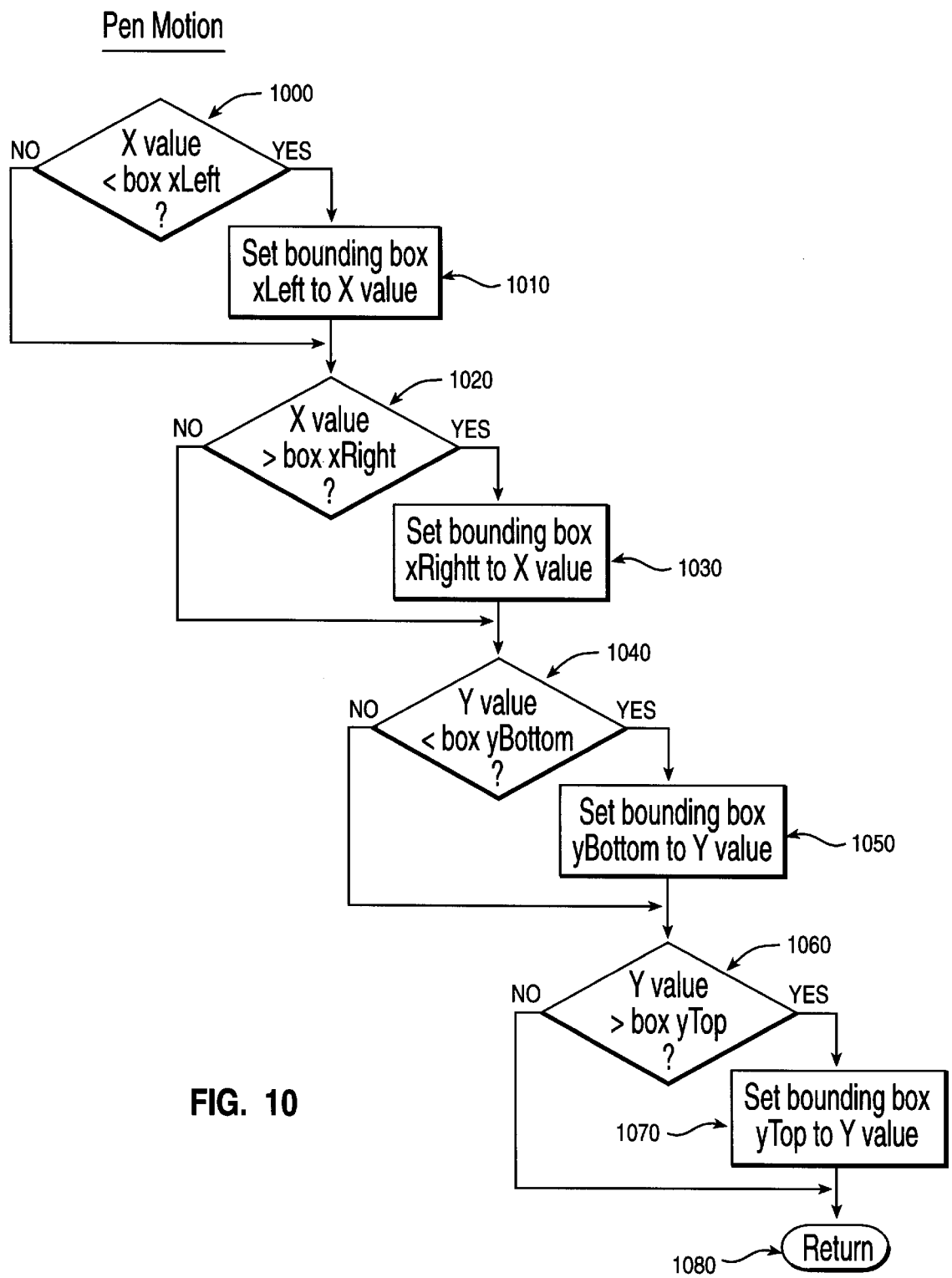
FIG. 10 is a flow diagram of the bounding box procedure while the pen is in motion.

FIG. 10 illustrates a pen motion routine invoked each time movement of the stylus is detected while the stylus is in contact with the digitizing sensor. As each new coordinate is received, the coordinate is checked to see if it falls outside the current stroke bounding box. The operations depicted in steps 1000 through 1070 detail the process of comparing the X value of the coordinate against the leftmost and rightmost values of the box and comparing the Y value of the coordinate with the topmost and bottommost values of the box. The bounding box is adjusted as the stroke continues to deviate outside it.

In step 1000, a test is performed to determine whether the X value of the coordinate is outside the left boundary of the box. If the system is not in writing mode 1002, movement of the stylus is monitored from the initial touchdown point to determine if the user has started to write 1003. If motion is of sufficient length, typically 0.060 inch, the user is considered to have started writing and the system enters writing mode 1004. If so, in step 1010, the boundary is set to the X value of the coordinate. In step 1020, a test is performed to determine whether the X value of the coordinate is outside the right boundary of the box. If so, in step 1030, the boundary is set to the X value of the coordinate. The test in step 1040 determines whether the Y value of the coordinate is outside the bottom boundary of the box. If so, in step 1050, the boundary is set to the Y value of the coordinate. The test whether the Y value of the coordinate is outside the top boundary of the box takes place is performed in step 1060. If true, in step 1070, the boundary is set to the Y value of the coordinate. The process ends in step 1080.

Figure 11:
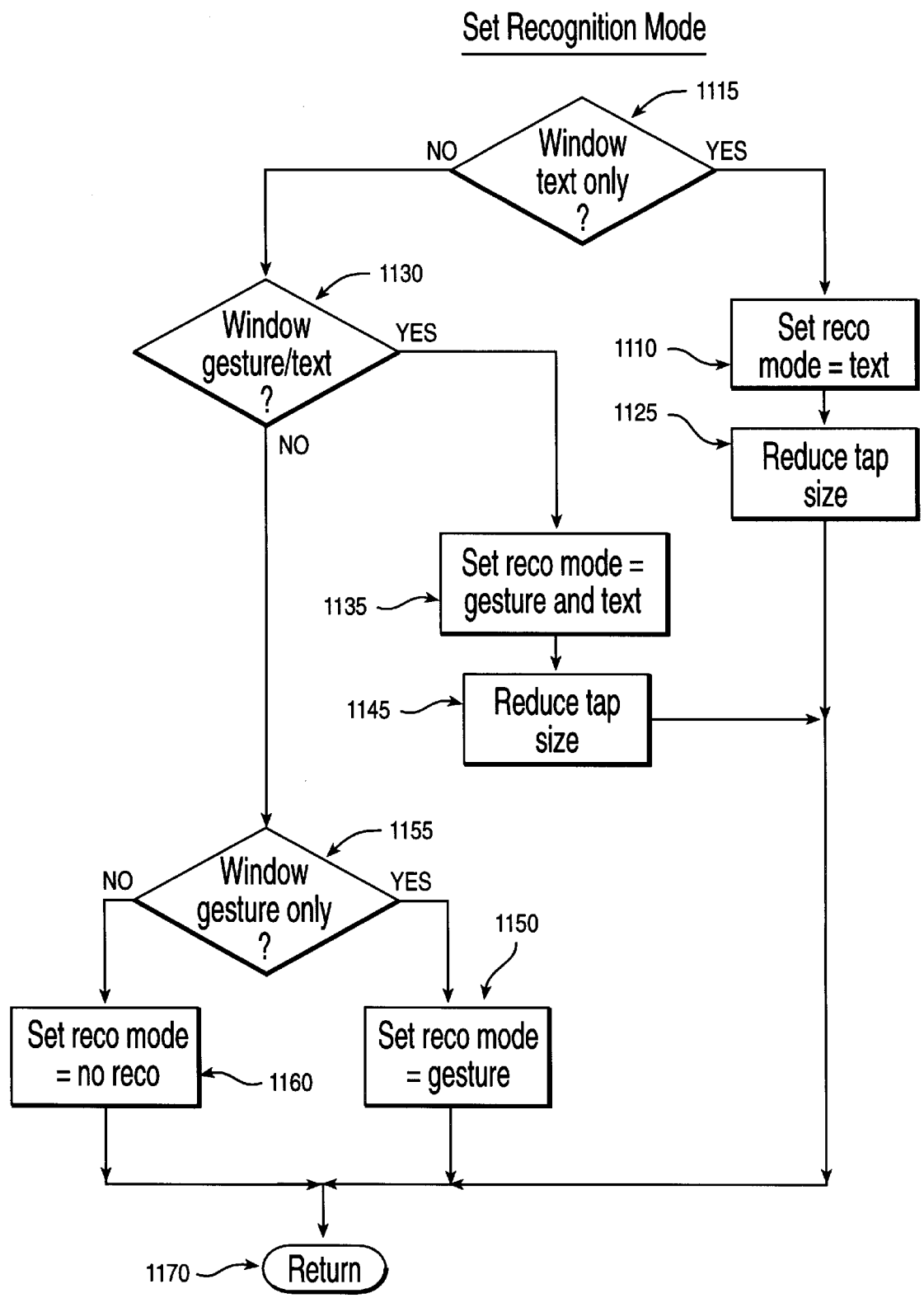
FIG. 11 is a flow diagram of the set recognition mode procedure.

In FIG. 11, a series of tests are shown which set the recognition mode of the window, determining whether the window should have text only, step 1115, gesture and text, step 1130, or gesture only, step 1155, modes of recognition. One possible criteria to be used for determining whether or not the window accepts text and/or gesture input is whether the user has stipulated a certain recognition mode via an end-user interface. Windows that are used for actual drawing will have all recognition disabled. This shown as process step 1160 in the flow diagram, but could be a decision block in an alternative embodiment. The recognition mode is then set appropriately in step 1110, step 1135 or step 1150. However, if text recognition is enabled, in the preferred embodiment which allows letter gestures which are distinguished by a tap, the allowable tap size is also reduced in step 1125 or 1145. It has been determined by the applicants that reducing the size of the tap allows the system to more easily differentiate between taps and small lower case letters. The process returns step 1170.

Figure 12:
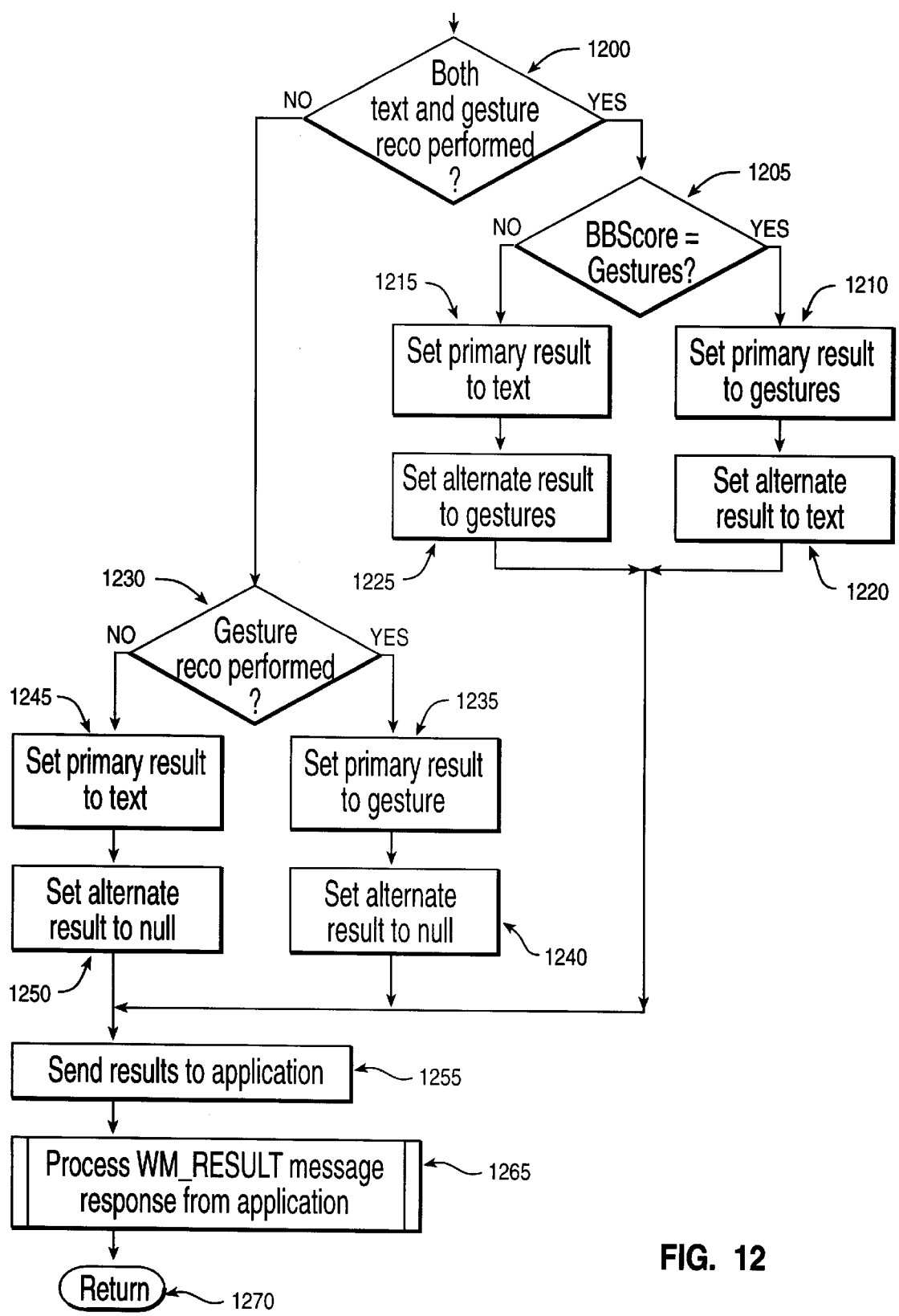
FIG. 12 shows the procedure of handwriting and gesture recognition.

FIG. 12 shows the logic of handling the recognition results. If both gesture and text recognition were performed, tested in step 1200, and the bounding box score was gesture, tested in step 1205, the primary result is set to gesture in step 1210. The alternate result is set to text in step 1220. On the other hand, if the bounding box score was handwriting, i.e. not gestures, in step 1215 the primary result is set to text and in step 1225 the alternative result is set to gestures. As discussed above in reference to FIG. 6 a recognition results data structure is sent to the target application. If the recognition results were gesture only, step 1230, the primary result is made gesture, step 1235 and the alternate result is made null, step 1240. Otherwise, the primary result is set to text in step 1245 and the alternative result is set to null in step 1250. In step 1255, a WM_RESULT message is sent to the application that contains the newly built recognition results block and the application response is subsequently handled in step 1265. The process returns in step 1270.

Figure 13:
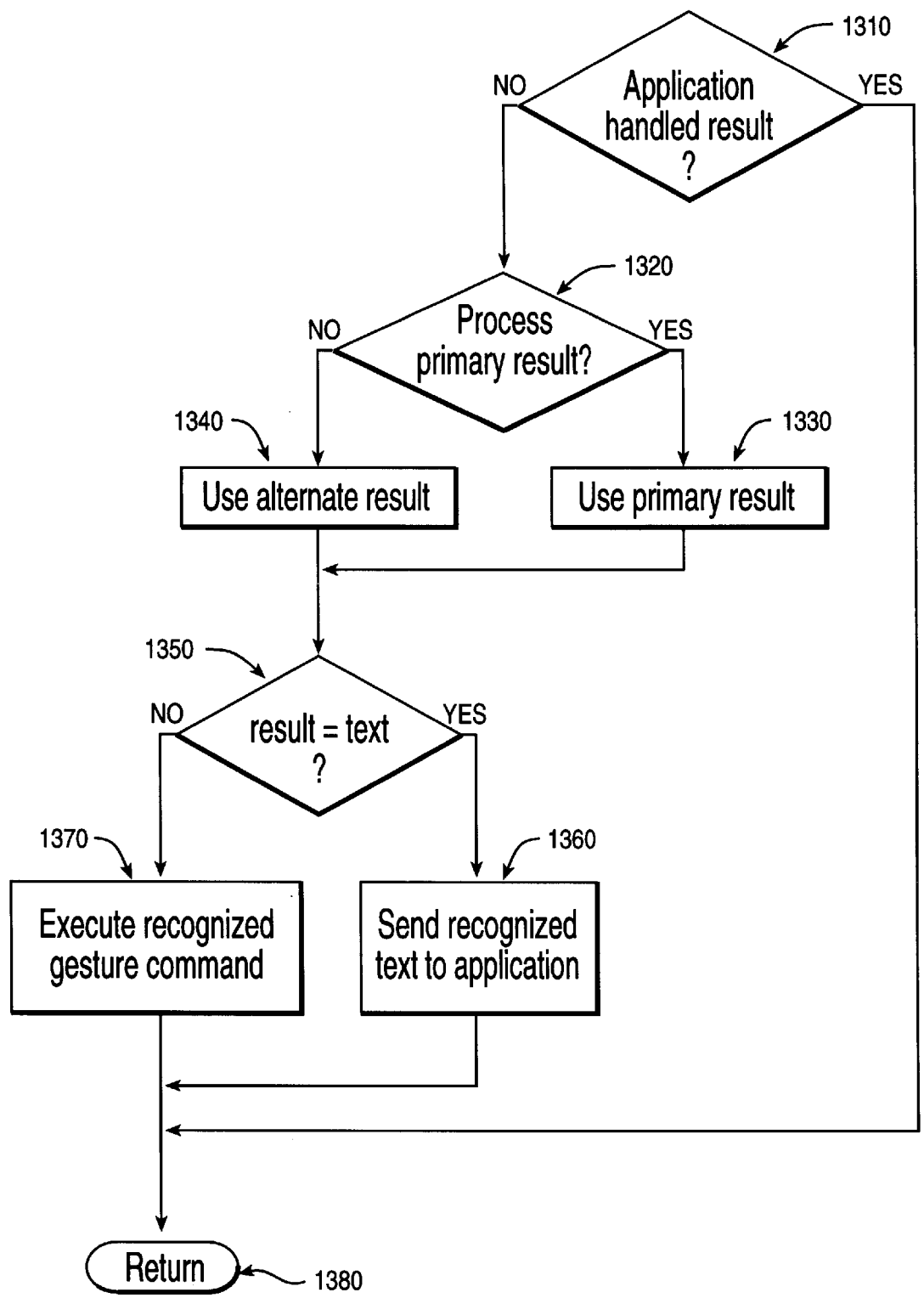
FIG. 13 illustrates the process for handling the handwriting and/or gesture input by the application.

The process for handling the response from the target application is shown in FIG. 13. In step 1310, a test is made to see if the application handled the recognition results itself. If not, the application response is examined to determine if the application wants the pen subsystem to process the primary or alternate result in step 1320. By default, the primary result is processed in step 1330, however, an application may override the default behavior and specify that the alternate result be processed in step 1340 if the application determined that the alternate results were a better match for its current environment. If the result is text, step 1350, the text string is sent to the target application in step 1360 in a manner that makes the characters appear as if they were generated by the keyboard. Otherwise, the gesture command is executed in step 1370. If the process was capable of handling the results according to the test in step 1310, the system returns in step 1380 taking no further action.

Figure 14:
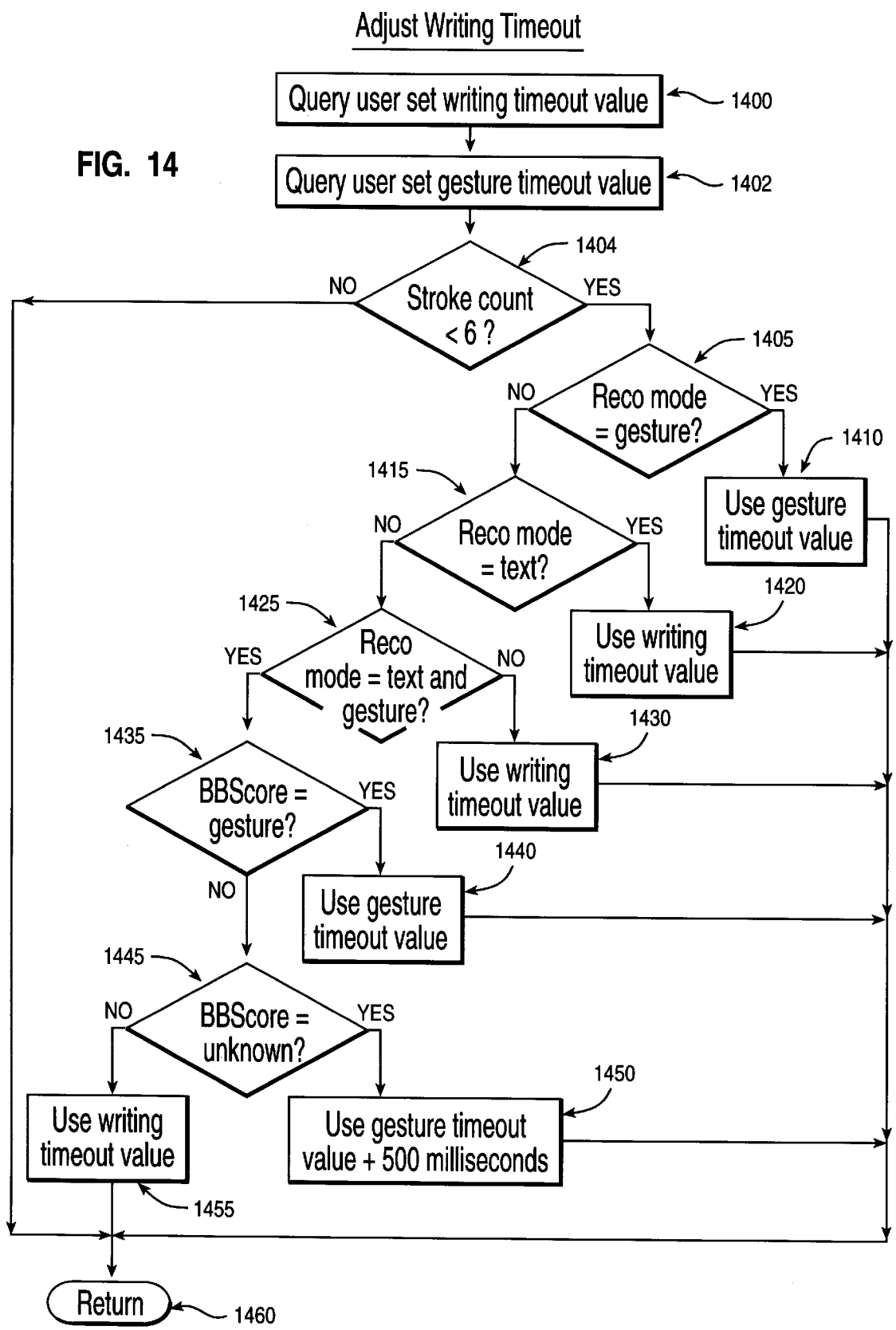
FIG. 14 shows the procedure for adjusting the handwriting and gesture timeout values.

In FIG. 14, the process for setting the writing timeout is illustrated. By way of background, each time the user completes a stroke, a writing timer is started so that the system can detect when the user has completed writing input. If the user touches down again with the stylus to continue writing, the writing timer is cancelled and the system appends the new stroke to the current collection of strokes. If the timer expires, it indicates the user has paused and therefore completed writing input. A value of 3.0 seconds is used for a writing timeout because tests have shown it can take a user 2.5 seconds to move from one side of a window to the other side when entering bulk text. A separate gesture timeout value is maintained because the 3 second writing timeout is too long to wait for a one or two stroke gesture to recognized and executed. The gesture timeout is 0.9 seconds. Ordinarily, when the recognition mode is gesture and text, the system must use the longer waiting period because it is not clear whether the user is in the act of gesturing or handwriting.

Referring now to FIG. 14, both the writing and the gesture timeout values are queried in step 1400 and step 1402 respectively. If the stroke count is under 6, tested in step 1404, the writing timeout is set according to the recognition mode. If the mode is gesture, step 1405, the gesture timeout value is used, step 1410. If the mode is text, step 1415, the writing timeout is used in step 1420. Step 1425 determines whether the recognition mode is mixed text and gesture. If not, the writing timeout is used in step 1430. When the mode is mixed, as determined in step 1425, the decision is made based on bounding box score. If the bounding box score is gesture, step 1435, the gesture timeout is used, step 1440. If the bounding box score is unknown, step 1445, a timer value equal to the gesture timeout plus 500 milliseconds is used in step 1450. This extra 0.5 second gives the users enough time to begin another word if the user is writing text. If the user is not writing text, the extra time adds only a slight gesture recognition delay. Otherwise, the score is text and the writing timeout is used, step 1455. If the stroke count is greater than 5, as determined in step 1404, no adjustment is made to the writing timeout which causes it to default to the full 3.0 second value. This method of dynamically setting the writing timeout based on bounding box score makes the user interface more responsive and it allows a user to execute a series of gesture commands in quick succession.

After a gesture or text character, a user will lift the stylus off of the touch screen. The process which occurs at the detection of a lift off event is detailed in FIG. 15. After liftoff, the stroke count is incremented in step 1500. In step 1501, the stroke is examined to see if it is a tap using the tap size set at touchdown. The current bounding box is then processed, step 1502, to classify the aggregate of strokes as either text or a gesture in progress.

At step 1504, a test is performed to determine whether this is the first stroke. If the stroke is a tap, as determined in step 1505, then the user desires mouse emulation, step 1530, and the system returns, step 1555. If the first stroke is not a tap, the length of the stroke is checked against the minimum gesture size in step 1510. The minimum gesture size was discussed above in connection with FIG. 8. The minimum gesture size in one preferred embodiment is typically on the order of 0.156 inches; it is needed by the pen subsystem to ensure that very small strokes are not interpreted by the system as gestures. If the first stroke is less the gesture threshold and the current recognition mode is gesture, step 1515, a mouse emulation process in step 1530 is performed. Otherwise, if the recognition mode is both text and gestures, step 1520, the recognition mode is modified to text only, step 1525, because a gesture cannot start with a stroke less than the minimum size. The current stroke is then added to the collection of strokes in step 1540 which in this case is the first one. At step 1545, a subroutine is called to adjust the writing timeout as discussed above in reference to FIG. 14. After the writing timeout is adjusted, the system sets and monitors the writing timeout, step 1550. Then, the process ends, step 1555.

Figure 15:
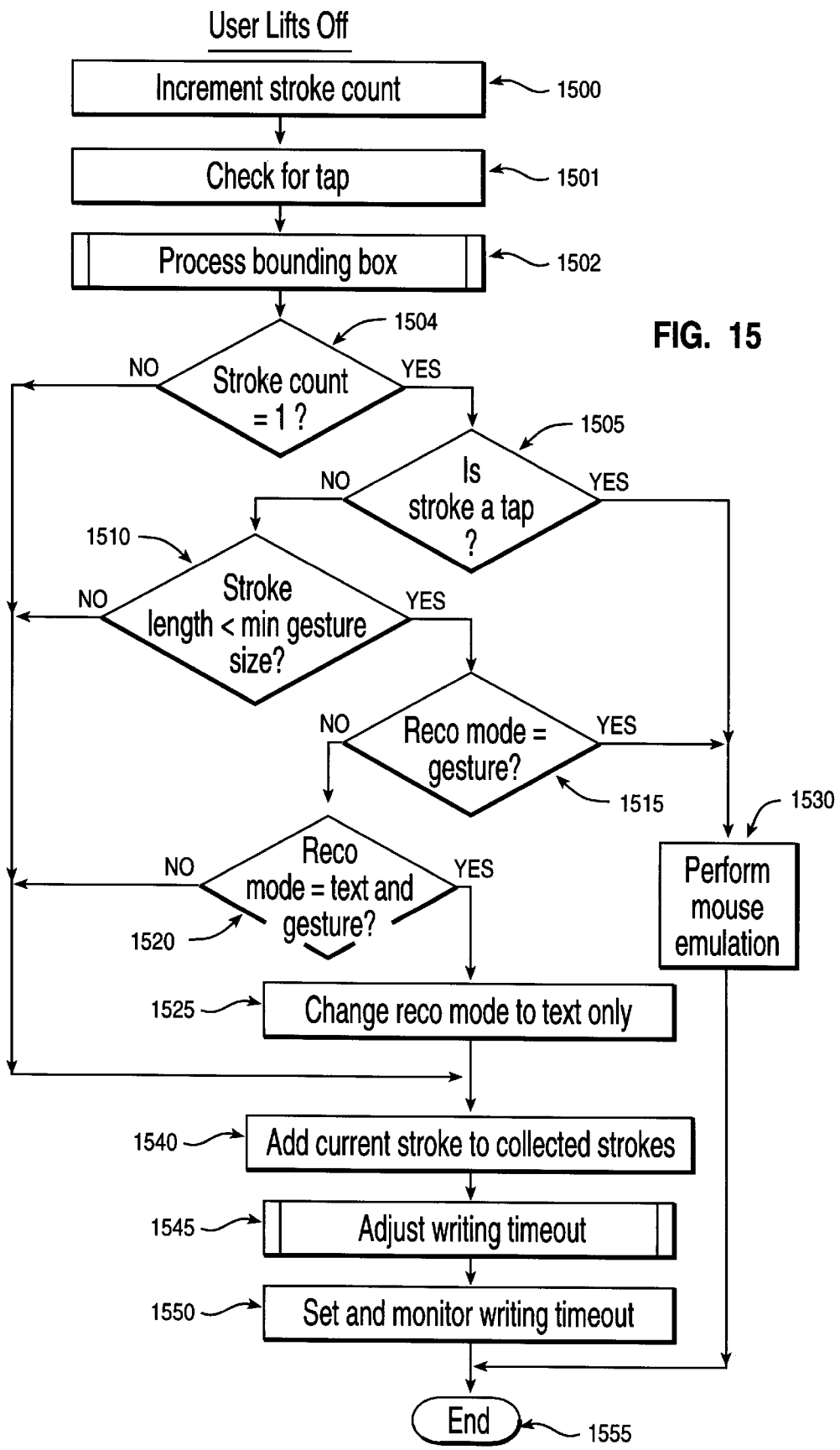
FIG. 15 is the flow diagram for the stylus liftoff procedure.

At this point, the user has drawn a single stroke. When the user again touches down with the stylus, referring back to FIG. 9, the system is already in writing mode, step 900, so the new touchdown point is again saved, step 960 and the bounding box is reinitialized, steps 970 and 980. The bounding box is updated as new points are received and eventually liftoff occurs. During liftoff processing, as depicted in FIG. 15, a check for tap is made, step 1500 and the bounding box is processed, step 1502.

The process for processing the collection of strokes is detailed in FIGS. 17, 18 and 19 and is discussed below. FIG. 15 shows the process for each stroke as it is added to the aggregate "doodle" in step 1540. After 5 strokes have been received, the result can not be a gesture given the set of gestures in the preferred embodiment, and the processing of the bounding box and the adjustment of the writing timeout ceases. Eventually, the user stops writing and there is an end of writing event to be processed.

Figure 16:
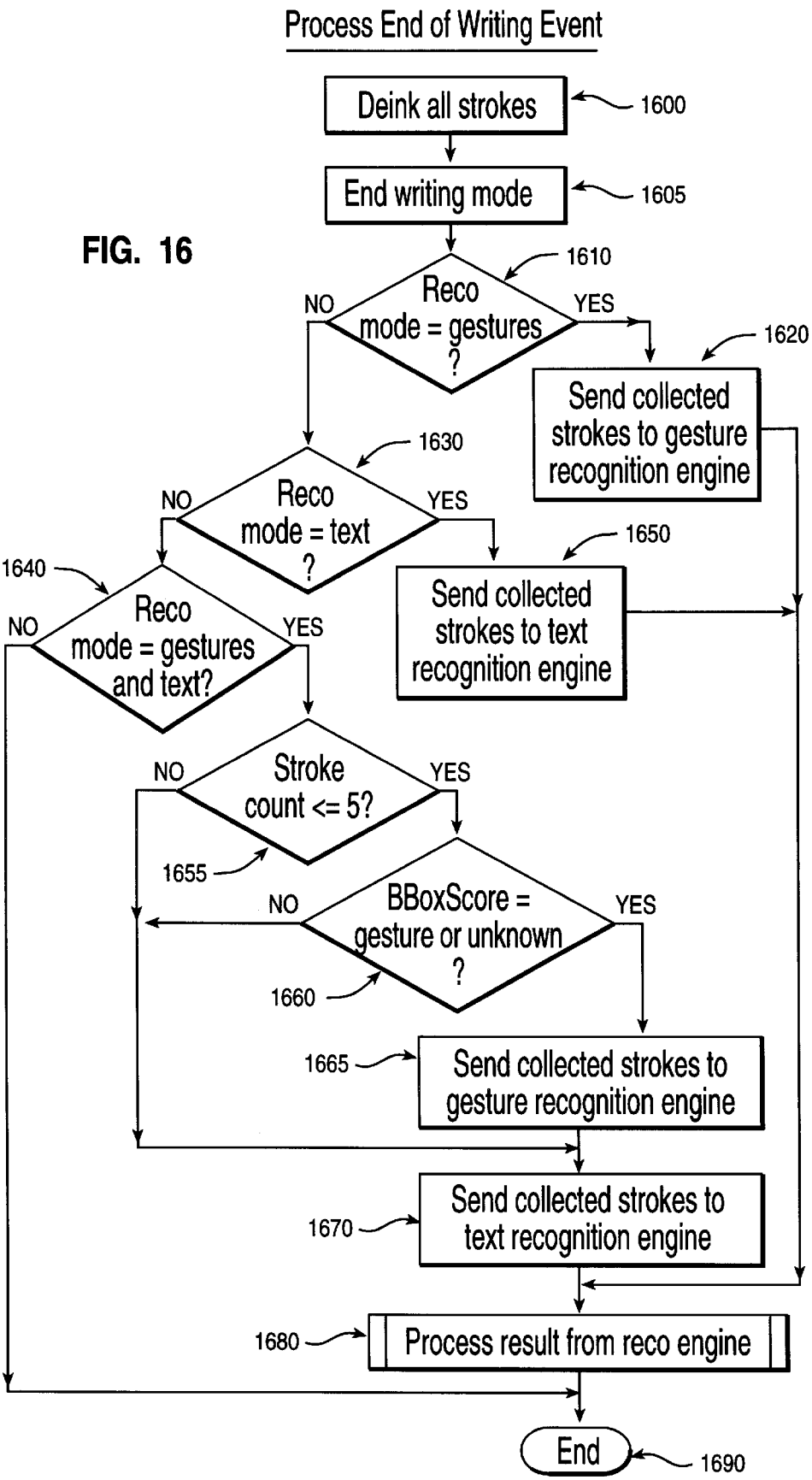
FIG. 16 depicts the process at the end of a writing event.

The process for the end of the writing event is described below in connection with FIG. 16. First, all of the collected strokes are "deinked" in step 1600. This means that the path of the stylus is no longer displayed. In step 1605, the system is taken out of writing mode to terminate the collection of strokes.

Next, the current recognition mode is tested in steps 1610, 1630 and 1640 as gestures, text or gestures and text respectively. Depending on the current recognition mode, the gesture or text recognition engine is invoked in step 1620 or step 1650 to perform the associated recognition.

In the case of a recognition mode of both gesture and text, as determined by step 1640, the stroke count is first examined to see if more than 5 strokes were drawn, step 1655. If so, the strokes must be text and the gesture recognition engine is bypassed and only text recognition is performed, step 1670. If the count is 5 or less, step 1655, the bounding box score is tested. If the score is neither gesture nor unknown, step 1660, again gesture recognition is bypassed and only text recognition is performed, step 1670. In these cases, the bounding box score serves to speed up the recognition process by elimination of the gesture recognition process which is computationally intensive. In the event that the bounding box score is gesture or unknown, step 1660, both gesture and the text recognition in steps 1665 and 1670 respectively are performed. One skilled in the art would appreciate that the handwriting recognition may be avoided if the bounding box score is gesture, however, in the experience of the applicants, the increase in speed is not worth the possibility of discarding a text input as an alternate. In step 1680, the results from the recognition engine are processed. The process returns, step 1690.

Figure 17:
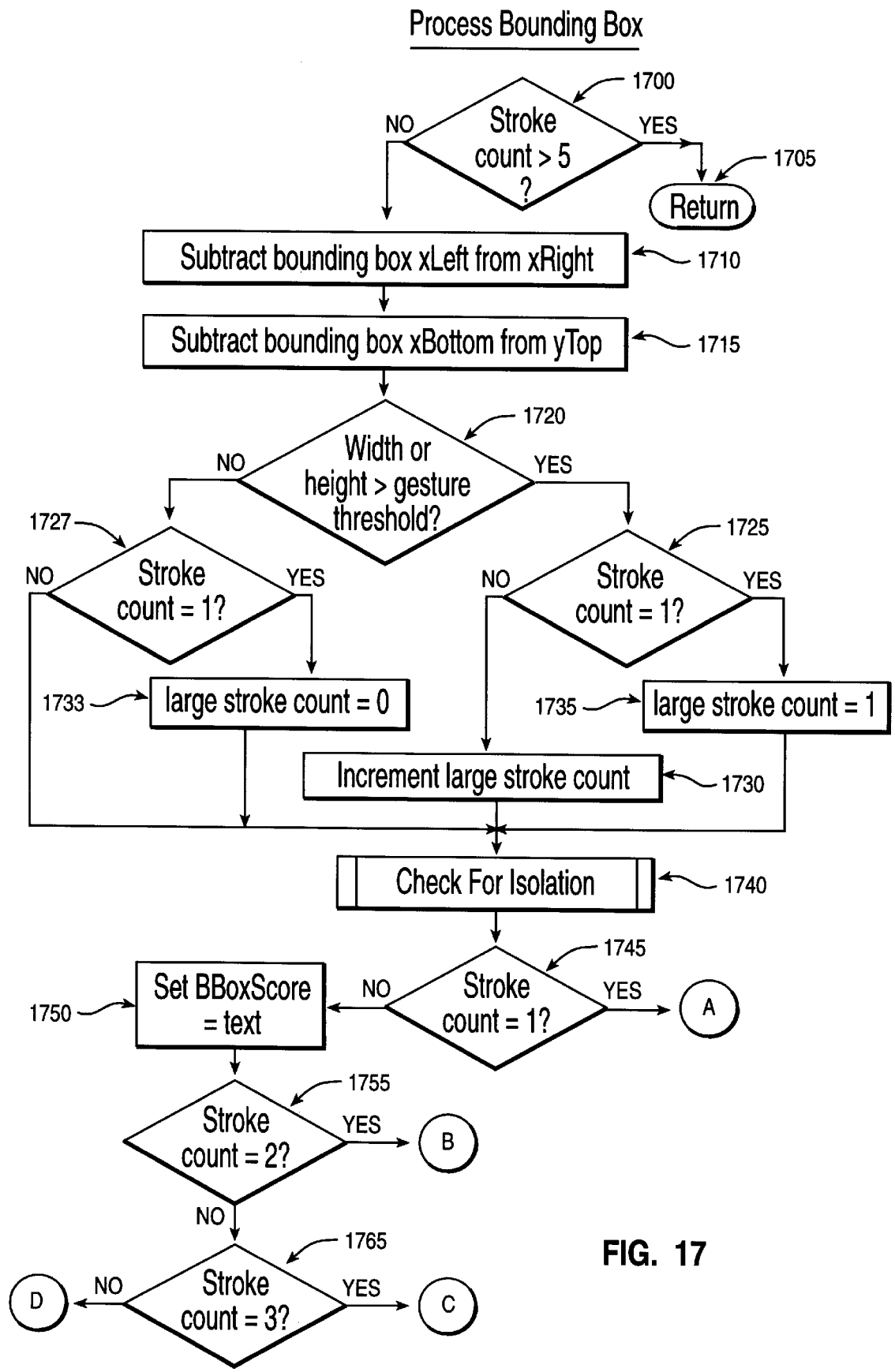
FIGS. 17, 18 and 19 are flow diagrams of the bounding box process.
Figure 18:
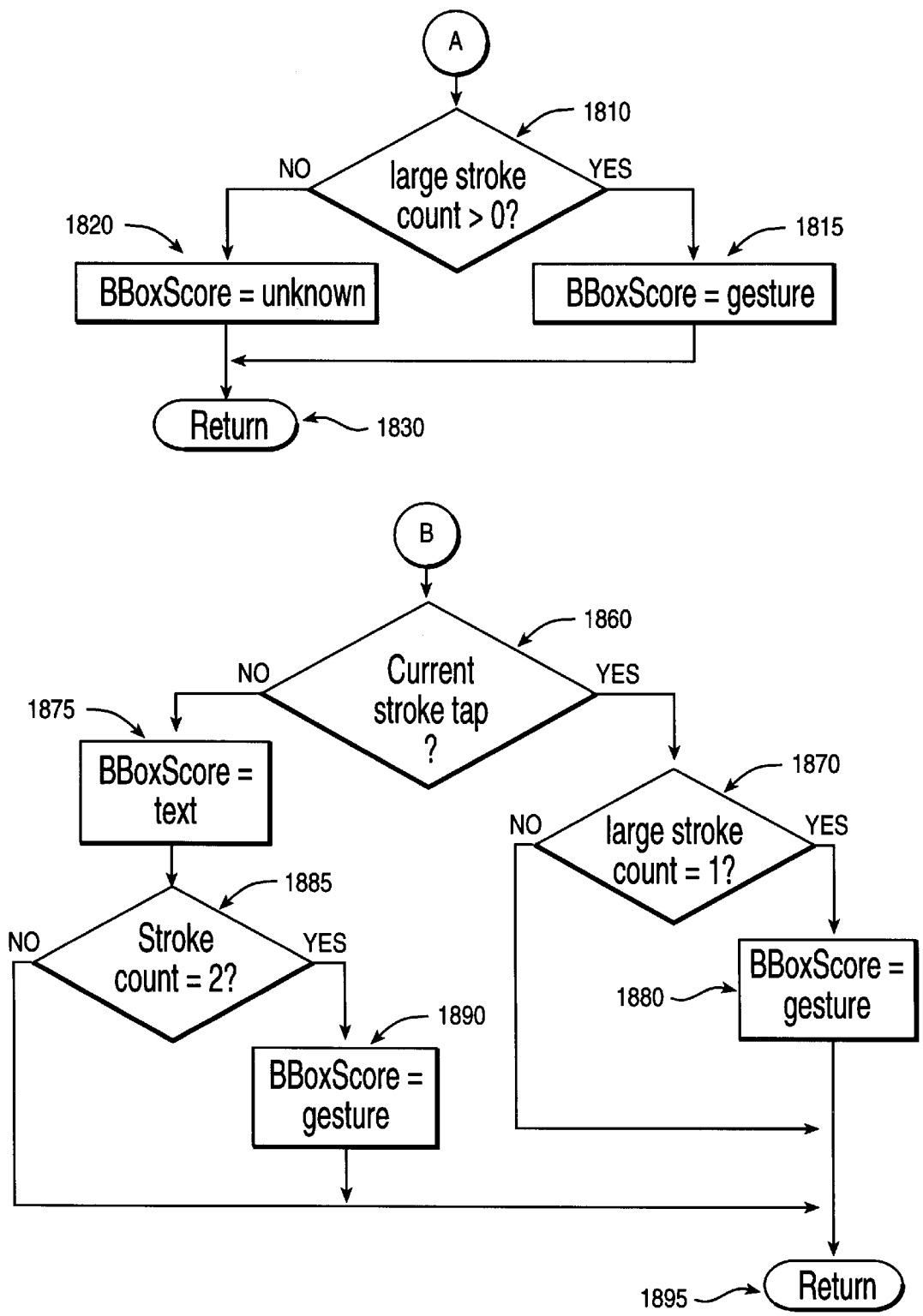
Figure 19:
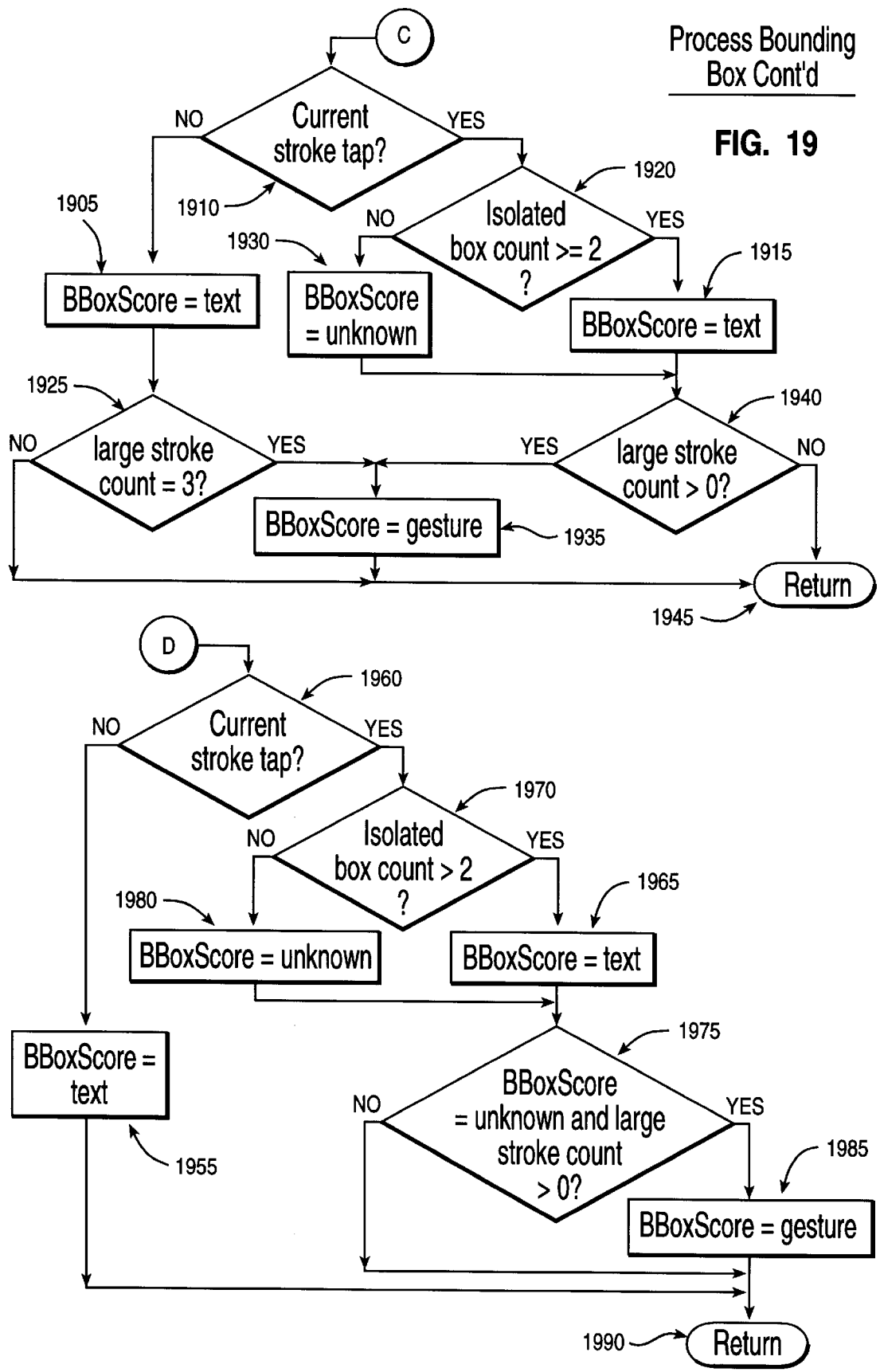

FIGS. 17, 18 and 19 diagram the logic flow of processing each of the first 5 strokes in a "doodle", or a collection of strokes. Since, in the preferred embodiment, there is no gesture shape consisting of more than 5 strokes, no bounding box processing is done after 6 strokes, tested in step 1700 have been collected. The process returns step 1705. Next, calculations of width and height of the bounding box are made by subtracting xLeft from xRight 1710 and yBottom from yTop 1715 respectively. Both the width and the height of the bounding box are checked against the width and height of the gesture threshold 1720. Both the width and the height are checked against the gesture threshold X and Y values in step 1720. This process is detailed below with reference to FIG. 24 below.

If the current bounding box exceeds the gesture threshold, the large stroke count is either set to one in step 1735 or incremented in step 1730 depending on whether the current stroke is the first stroke of the doodle, tested in steps 1725 and 1727. If the bounding box is smaller than the gesture threshold 1720, and the current stroke is the first stroke in the doodle 1727, then the large stroke count is set to zero 1733.

Once the stroke has been checked for size, it is further analyzed to determine if it is an isolated stroke in step 1740 which is indicative of handwriting. Discussion of the isolation routine is found below in connection with FIGS. 20, 21 and 22. The isolation routine will ensue when the subsequent strokes of the doodle are processed. In the first stroke, step 1745 tests true, because this is the first stroke and passes to the process steps illustrated in FIG. 18.

In FIG. 17, the size of the bounding box is compared to the gesture X/Y threshold, step 1720, and the large stroke counter is incremented, step 1730, if the size exceeds the threshold. The check for isolation routine is called in step 1740 to determine if the second stroke is isolated from the first stroke. Please refer to the discussion referencing FIGS. 20, 21 and 22 below to understand the isolation testing process.

After the isolation testing routine, the process returns to step 1745 where a check is performed to determine if the current stroke is the first stroke. If so, the process goes to A in FIG. 18. In the preferred embodiment, for strokes 2 through 5, the bounding box score is always preset to text, step 1750. This is done because it is much easier to recover from having a character inserted into a window than to recover from the results of some unintentional gesture command. Also, the user has a reliable method of ensuring strokes are recognized as gestures, i.e. drawing strokes larger than the gesture threshold. In test 1755, it is determined if the count stroke is 2. If so, the process goes to B in FIG. 18. In test 1765, it is determined whether the count stroke is 3. If so, the process goes to C in FIG. 19. If not, the process goes to D in FIG. 19.

Referring to FIG. 18, at step 1810, the large stroke count is examined. If the first stroke was large, the bounding box is scored as a gesture, step 1815. Otherwise, in step 1820, it is scored as unknown. With only a single stroke of small or average size, it is equally possible that the user intended a gesture or a handwritten character. The subroutine then returns in step 1830 to the liftoff routine.

On the second stroke, as determined by step 1755 in FIG. 17, the stroke is tested to determine if it is a tap in step 1860. In the preferred embodiment, which uses letter gestures, a tap as a last stroke is a characteristic of a gesture. In addition to the 26 letter gestures there are checkmark tap, up caret tap and question mark. If the stroke is not a tap, the bounding box score is set to text in step 1875. A test is made in step 1885 to establish whether both strokes were larger than the gesture threshold. If so, the doodle is a two stroke gesture and the bounding box score is set to gesture. This is premised on the two stroke gesture requirement that if the second stroke is not a tap, then two strokes must be approximately the same length. If the current stroke was a tap in step 1860, the large stroke count is tested for a non-zero value, step 1870. If the first stroke was large, gesture is scored in step 1880. The process returns in step 1895 to the calling routine.

The bounding box processing for the third, fourth and fifth strokes is shown in FIG. 19. The processing becomes more complicated as the isolated rectangle count is taken into consideration. FIG. 3A lists the three-stroke gestures. In the preferred embodiment, there are 6 three-stroke gestures which are not letter gestures and the system requires that all three strokes be large when making these 6 gestures. The need to examine isolation comes into play when the third stroke is a tap because 13 of the 26 letter gestures can be drawn with two strokes and a tap and letter gestures are ambiguous with text. Similar to two stroke processing, the stroke is checked for a tap in step 1910 and the bounding box score is set to text in step 1905 if the current stroke is not a tap. In step 1925, the large stroke count is tested to determine whether all three strokes were large. If so, the score is set to gesture in step 1935. If the current stroke is a tap, step 1910, the isolated box count is tested for a value of 2 or more in step 1920. If the count is two or more, the score is set to text, step 1915. Otherwise, the bounding box score is set to unknown in step 1930 due to ambiguity. A subsequent test of the large stroke count helps to resolve the ambiguity in step 1940. If there is at least one large stroke, the bounding box score is changed to gesture in step 1935. The process returns to the liftoff routine.

The D entry point in FIG. 19 handles the cases of the fourth and fifth strokes. In the preferred embodiment, there are 6 possible four-stroke gestures and each one is terminated by a tap stroke. Therefore, in this embodiment, if the fourth stroke is not a tap as determined by step 1960, it is given a final score of text in step 1955. If the fourth stroke is a tap, and there are 2 or more isolated rectangles, step 1970, the strokes are undoubtedly text-and so scored in step 1965. Otherwise, the bounding box score is set to unknown in step 1980. With the fourth stroke, the test normally conducted for large strokes is only made if there is ambiguity and the bounding box score is unknown, step 1975. If there is at least one large stroke, the bounding box score is changed to gesture, step 1985. Note that even if the user writes very large, if the fourth stroke is not a tap, the strokes are scored as text. The same holds true for the fifth stroke. In the preferred embodiment, there is only one five-stroke gesture and that is the E. (E tap) gesture. The process returns to the liftoff process is discussed above in relation to FIG. 15.

Figure 20:
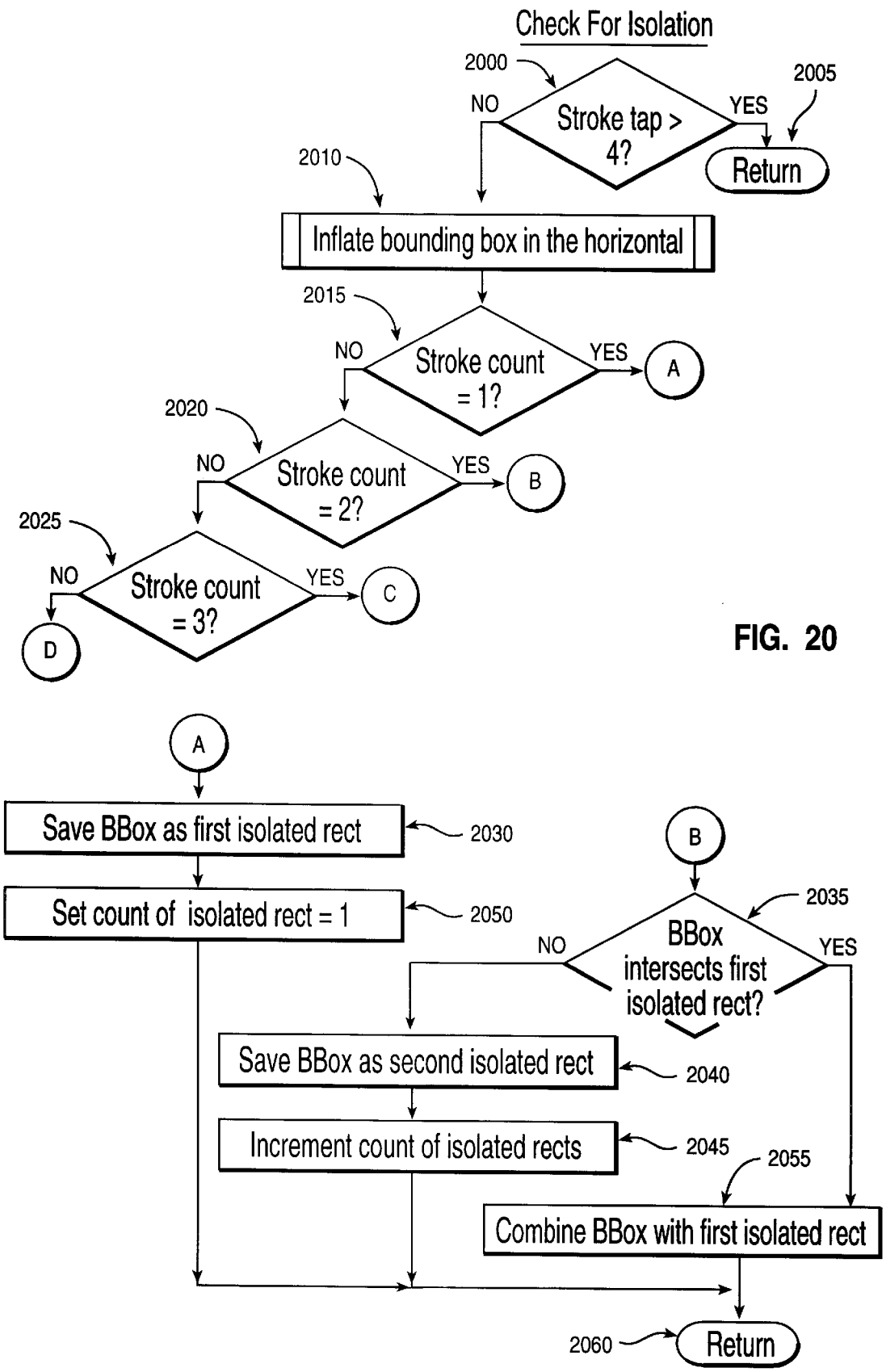
FIGS. 20, 21 and 22 illustrate the check for isolation process which is used for distinguishing between gestures and text.
Figure 21:
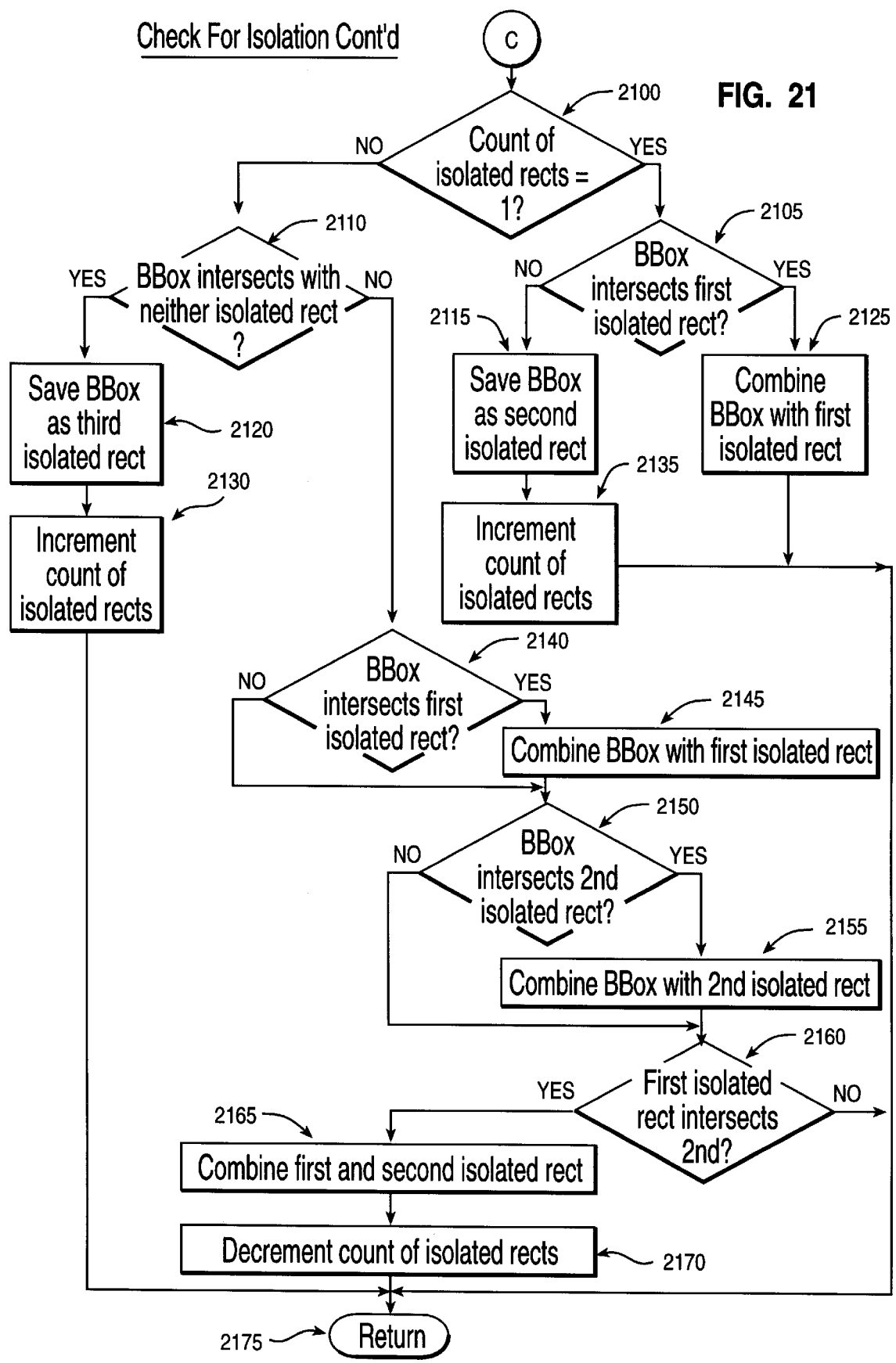
Figure 22:
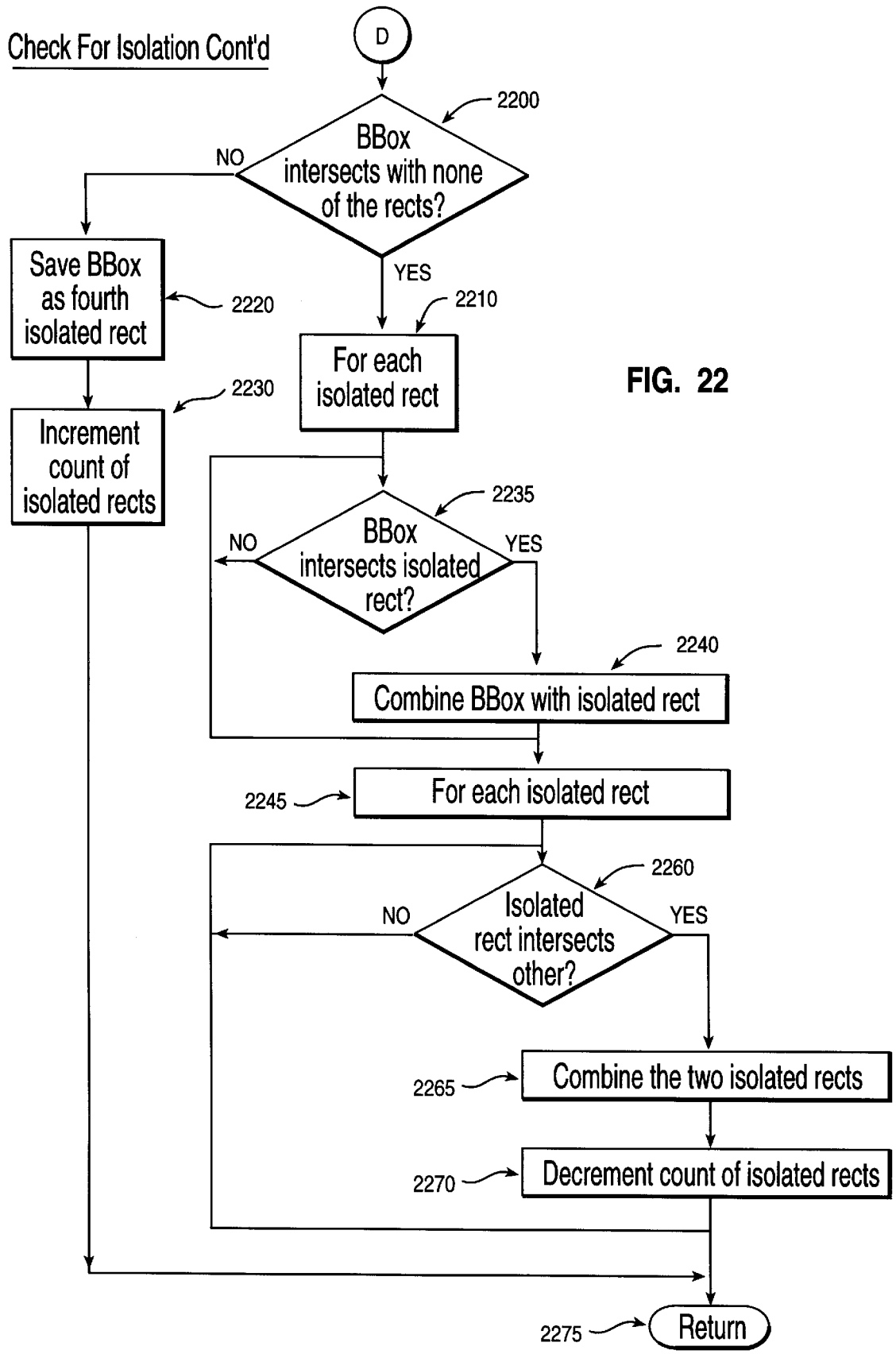

FIGS. 20, 21 and 22 detail the isolation testing process. Isolation testing is preferably accomplished on the first 4 strokes of a doodle. The test in step 2000 returns the user to the liftoff process, step 2005, if the stroke count is greater than 4. As there is only 1 5-stroke gesture defined in the preferred embodiment, the E. (E tap) gesture, it is not necessary to process the bounding box of the fifth stroke to distinguish it from text. Summarizing the isolation test process detailed below, the first 4 strokes are checked for isolation or separation in the horizontal dimension only. This is because English and most languages are written horizontally. Whereas text has a horizontally spreading feature to it, gestures do not. A minor exception to this rule is the up and down flick gestures which may be drawn with some horizontal displacement, but this has no adverse effect on the technique. When testing for isolation or horizontal separation, isolation is defined as strokes being separated by at least 0.040" inch along the entire vertical axis of the display. The distance of 0.040" equates to 2–4 pels on a display. The pen digitizer on the market today have a resolution of typically 200–150 dots per inch and the spatial distance between strokes can be determined very accurately. The reason strokes separated by less than 0.04 are considered to be touching is to account for sloppiness in user handwriting. When crossing a "t" or an "H", the crossbar often starts in front of the vertical stroke which turns an H. (H tap) gesture into "lt." or "It.".

As the first 4 strokes are drawn, they are divided into separated entities represented by an isolation rectangle. As each new stroke is processed, the bounding box of that stroke is combined with the bounding box of any other stroke which it touches. With four strokes having been drawn, the minimum number of isolated rectangles would be 1, the maximum would be 4 if all 4 bounding boxes were non-touching. After a new stroke is combined with the other strokes it touches, the isolation rectangle is then tested to see if they are still isolated. As isolated rectangles grow to touch other isolated rectangles, they are combined, reducing the number of isolated rectangles.

Examining the logic, the process commences by inflating the bounding box in the horizontal by an amount equal to the stroke spacing value or 0.040 inch step, 2010. The inflation process was described above in connection with FIG. 7. The rectangle is inflated by adjusting two Cartesian coordinates, (xLeft and yBottom) and (xright, yTop), located in opposite corners of the rectangle. In one preferred embodiment, (xLeft, yBottom) is also the rectangle's origin point.

When the first stroke was received in step 2015, it was saved as a isolated rectangle in step 2030. The count of isolated rectangle was set to 1 in step 2050. Next, the second bounding box is processed in step 2020, and the bounding box and the first isolated rectangle are tested to see if they intersect, step 2035. If so, they are combined by calling a common system function to union or combine two rectangles in step 2055. If the second bounding box was isolated, a second isolated rectangle is formed in step 2040 and the number of isolated rectangles is incremented in step 2045.

The test in step 2025 determines whether there is third stroke to be tested. If so, the third bounding box is processed in FIG. 21. If there is only one existing isolated rectangle, the test is made to see if the two intersect, step 2105. If so they are combined in step 2125. Otherwise, a second isolated rectangle is formed, step 2115. The count of isolated rectangles is incremented in step 2135.

If more than one isolated rectangle exists in step 2100 and the third bounding box does not intersect with either one, step 2110, a third isolated rectangle is formed in step 2120. The count of isolated rectangles is incremented in step 2130. If the third rectangle does intersect with one of the existing rectangles, step 2140, it is combined with the first isolated rectangle, step 2145 if they touch. The third rectangle is combined with the second isolated rectangle in step 2155 if they touch, step 2150. Then, the two remaining isolated rectangles are tested to see if they now touch in step 2160 after processing the third bounding box. If the isolated rectangles are determined to touch in step 2160, they are combined in step 2165. The count of isolated rectangles is decremented in step 2170.

A similar method is used when handling the fourth bounding box. FIG. 22 depicts this processing using software loops instead of discrete steps because of the numerous tests that have to be made when three isolated rectangles exist. In FIG. 22, if the fourth bounding box does not intersect with any of the existing isolated rectangles step 2200, the bounding box is saved as a new isolated rectangle step 2220, and the count of isolated rectangles is incremented, step 2230. If the fourth bounding box does intersect with one or more of the isolated rectangles in step 2200, a loop is entered, step 2210 through step 2240, where the current bounding box is combined step 2240, with each isolated rectangle it touches, step 2235. After testing the bounding box against all existing isolated rectangles, another loop is entered where each isolated rectangle is checked step 2260, to see if it now touches one of the other isolated rectangles. If so, the two touching rectangles are combined, step 2265. Each time two isolated rectangles are combined into one step 2265, the count of isolated rectangles is decremented, step 2270. The routine returns step 2275.

Figure 23:
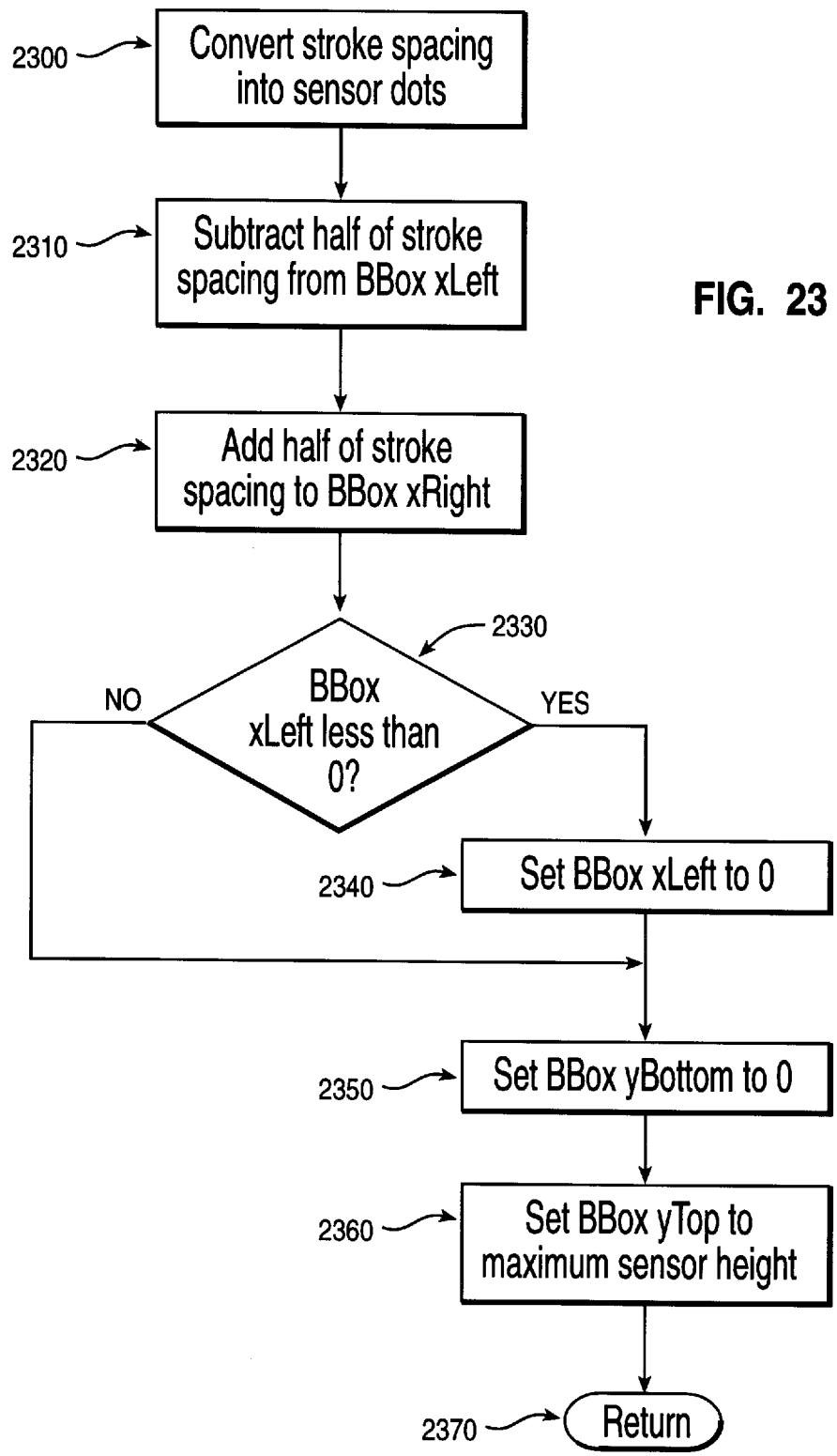
FIG. 23 shows the process for inflating the bounding box in the horizontal direction.

In FIG. 23, the process for inflating a bounding box in the horizontal direction is depicted. This is accomplished by subtracting one half of the value from the left side of the bounding box in step 2310 and adding half to the right side step 2320. The bounding boxes are inflated to make it easier to test if they are separated by a distance greater than the stroke space value of 0.040". To inflate the bounding box equally, one half of the stroke space, 0.020", is added to the xRight value of the bounding box 2320. To inflate the left side of the bounding box, it is necessary to move in the negative direction so 0.020" is subtracted from the xLeft value of the bounding box 2310. By inflating each side 0.020", if two adjacent bounding boxes do not touch, it means they were originally separated by a distance greater than 0.040". The xLeft values are checked to ensure that the bounding box remains within the bounds of the display in step 2330. The left boundary box boundary is set to 0 if it went negative, step 2340. The yBottom value is then set to 0, step 2350, and yTop is set to the maximum sensor height, step 2360, to make it easier to perform rectangle intersections and unions. Note that in the preferred embodiment, the vertical spacing is never examined and unimportant. This assumes that the user is writing in a horizontal direction only.

Gesture Threshold

To help resolve the ambiguities between gesture symbols and text and to give users greater control over the recognition process, the present invention will force doodles to be recognized as gestures if the doodle contains fewer than 6 strokes and if the strokes were drawn large. The invention provides the user with the means to set a gesture threshold size which is used to classify strokes as large enough to force a gesture recognition result. Once the user sets this threshold size and learns to maintain an awareness of it, the incidents of gesture/text misrecognition are greatly reduced.

Should the user choose not to customize the gesture threshold for his/her particular handwriting size, the system may retrieve the setting of the lined or ruled handwriting pad assuming that this setting will accurately reflect the size of the users handwriting.

If, for example, the user set the line spacing to be ½ inch, the gesture threshold would be computed as 150% percent of this size or ¾ inch. To have the gesture threshold set accurately is important because if the threshold is too close to the actual handwriting size of the user, text characters may be recognized as gestures commands.

These gesture commands may result in unwanted and even harmful actions performed on the current application in use. It is very frustrating to have spurious gestures commands occur while editing or writing text. If on the other hand the gesture threshold is too large, the user is forced to draw an exaggerated gesture symbol which is unnatural and disruptive when trying to focus on a specific task of an application. One disadvantage of having to draw gestures much larger than need be is that each gesture has a hot spot associated with it and gesturing often requires precise placement of the hot spot over an object which is to be the target of the gesture command. Drawing unnaturally large gestures makes hot spot placement less precise and causes gesture commands to be mistargeted. Excessively long strokes also create additional computational load both handling the strokes and then during the recognition process. Ideally, a user should be able to gesture quickly and accurately.

The present invention seeks to automate the sizing of the gesture threshold by monitoring handwriting recognition and computing the mean handwriting size from the results. Automating this process relieves the user from the burden of adjusting it and once the user learns to write naturally and consistently, the automated method will allow a tighter threshold.

Figure 24:
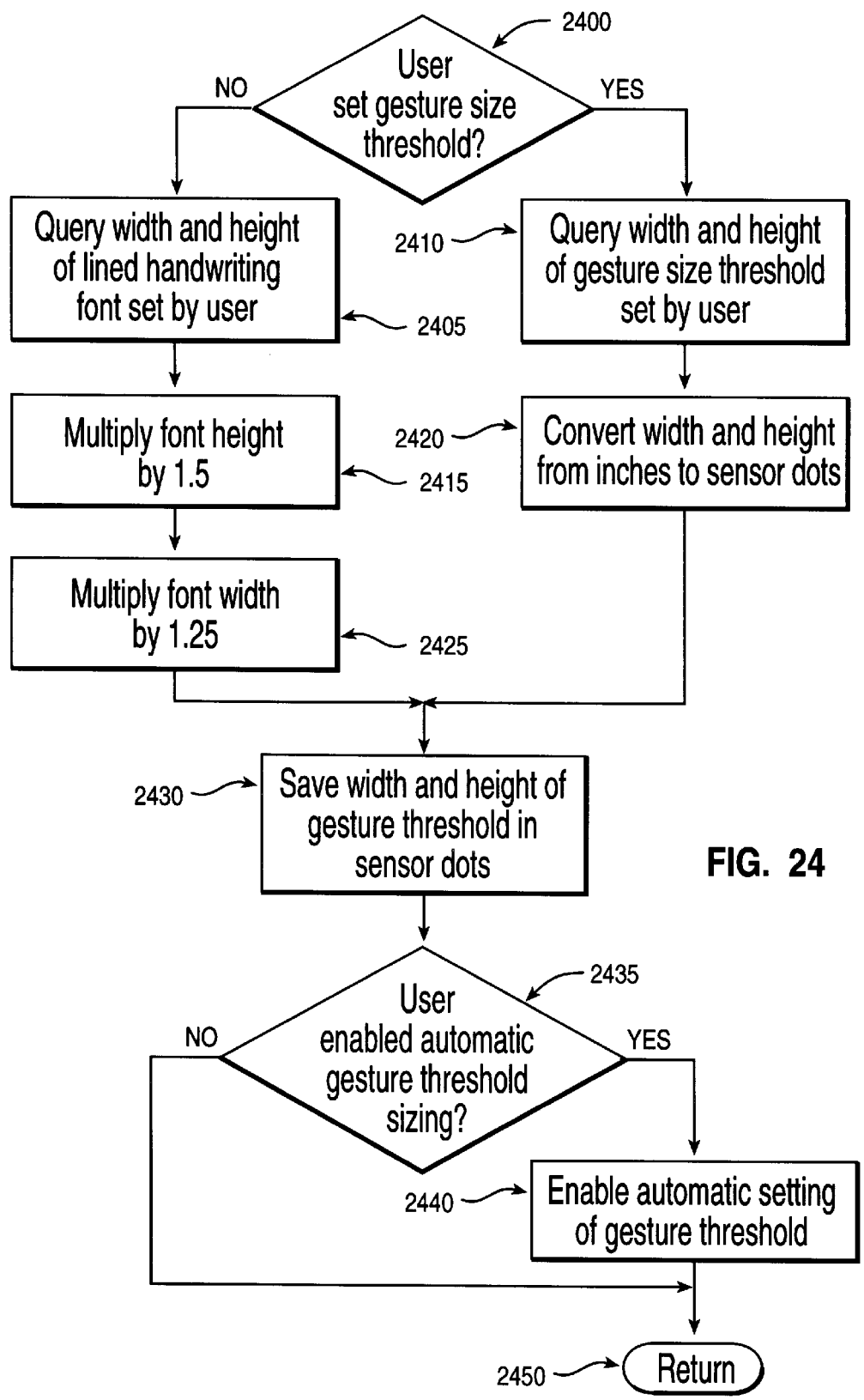
FIG. 24 is a flow diagram for initializing the gesture threshold size.

FIG. 24 depicts how the gesture threshold is set during system initialization. If the user set the threshold size manually, step 2400, the width and height are queried from the user profile and then converted from inches, the unit of measure in which they are stored, to sensor dots. The size of the gesture threshold is user settable to account for the person-to-person variability in size of hand printed characters. The size of the gesture threshold is specified in inches and at system boot time and anytime the user changes the gesture threshold size. Using inches to specify the threshold size instead of sensor dots ensures that the gesture threshold will be the same size regardless of sensor type or size.

If the user did not set the gesture threshold size via an end-user interface, the width and height of the font used for lined handwriting are queried in step 2405. In steps 2415 and 2425, the width and height of the front are multiplied by a small factor, 1.5 and 1.25, to enlarge them. FIG. 5 shows one possible end-user interface for setting the lined font size. By setting the font size, the user sets the line spacing used in a line handwriting window. The spacing set by the user is a good indication of a user's normal handwriting size. The height and width are enlarged by 50% and 25% respectively because when writing in an unruled window, there are no lines to constrain the user's handwriting and the handwriting will often be larger than normal. Once the threshold size is obtained, it is saved in units of sensor dots in step 2430. Then a test in step 2435 is made to see if the user has enabled the automatic setting of the gesture threshold. If so, the system sets up an environment to dynamically determine a user's handwriting size in step 2440. It should be noted that it is useful to set the gesture threshold larger in the vertical direction to reflect the characteristic variance in writing height due to upper and lower loops.

To summarize the present invention, the average height of a person's handwriting is computed by measuring the height of a bounding box drawn around each recognized word. When the pen subsystem passes a doodle to the recognition engine, it is simply a collection of strokes, each of which having its own bounding box. During the recognition process, the strokes are grouped into letters and the letters are then grouped into words. The engine returns a result buffer that contains the recognized text string and a bounding box structure for each recognized word. As the invention processes each bounding box in the result structure, the letters and case of each word is examined. Any word that is distorted by a lower case loop or a punctuation mark like an apostrophe or quote, is filtered out and the remaining word bounding boxes are averaged but not yet validated. The invention waits until the text string get delivered to the application to see if the user is satisfied with the recognition accuracy. Only the user knows with certainty what he/she wrote and if there were recognition errors in the text string, the invention determines which words were misrecognized and the bounding boxes associated with those words are discarded. The misrecognized words are made known to the invention when the user corrects them either in a correction dialog or through direct editing. The before and after correction comparison is made of the text to know what was changed. Although the invention can obtain the corrected words, it chooses to ignore them for three reasons. First, most corrections are performed on a character basis, not a word basis. Second, the correction dialog will usually take place using boxed or lined recognition mode for higher accuracy which is considered invalid for statistics gathering. Third, users will often alter their writing size when editing or correcting text. The best statistics are obtained from long, complete sentences that are properly punctuated.

Figure 25:
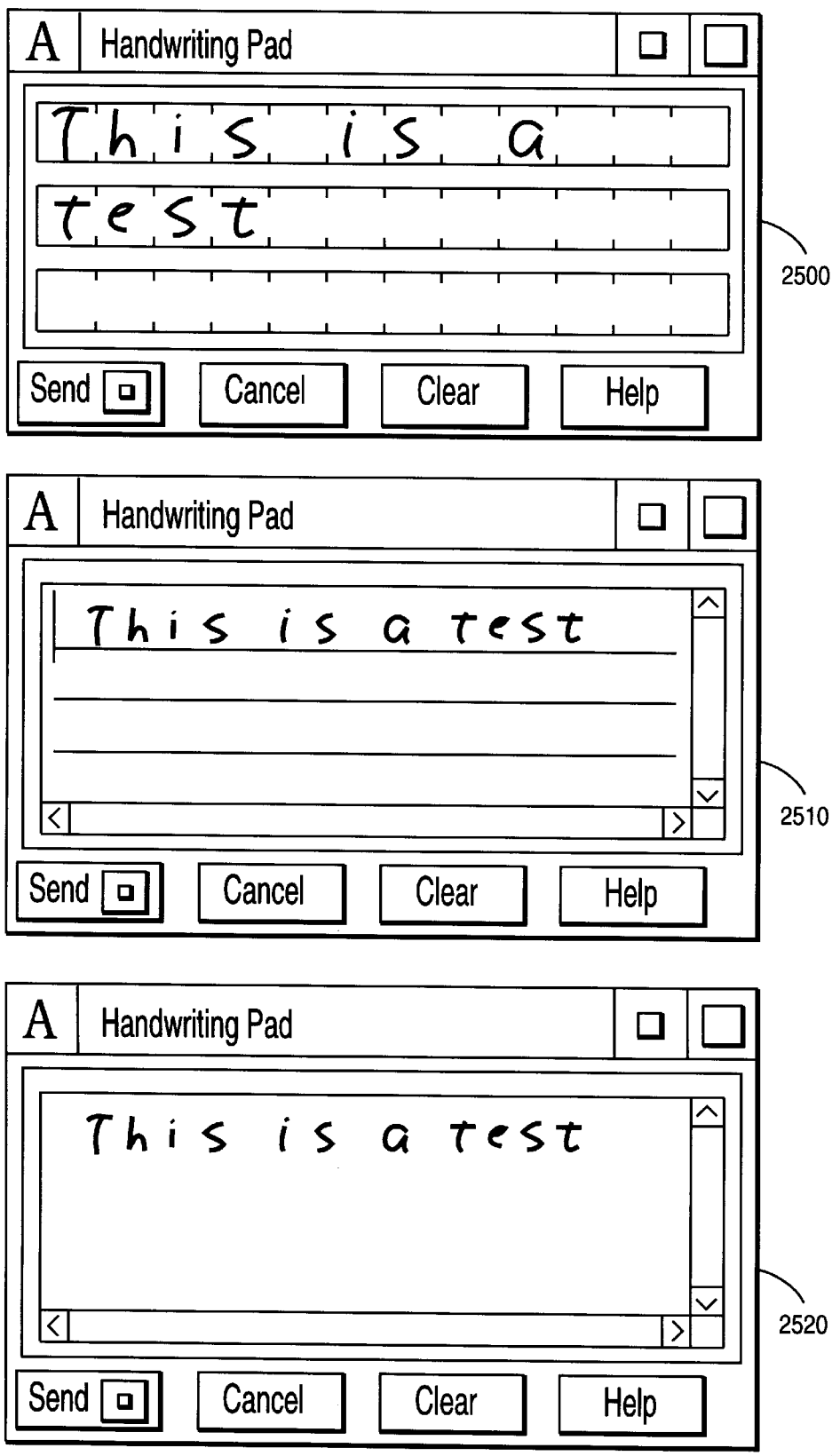
FIG. 25 show a handwriting pad in boxed, lined and unlined modes.

FIG. 25 contains a plurality of handwriting pads 2500, 2510, 2520 in boxed, lined and unlined modes respectively. Because boxed and line modes constrain-the user's handwriting shown in boxed pad 2500 and lined pad 2510, all boxed and line mode character recognition results are ignored. In the preferred embodiment, the invention relies solely the recognition results of unlined input shown in pad 2520.

FIG. 26 lists the lower and upper case letters. Although handwriting varies greatly, the shape of the characters as drawn 2600, 2610, 2620 is representative of the general population. The lower case letters are categorized by whether they contain upper 2610 or lower 2620 loops. The present invention seeks to determine a person's average handwriting strictly for the purpose of discerning gestures from text input. This is done by determining if the stroke pattern of a doodle has text or gesture characteristics. This differentiation process is done real-time as each stroke is processed by the pen subsystem and the system makes no attempt to perform any recognition. The main requirement is to ascertain the average height of any stroke in a character, not necessarily the average height of the character. Because of this, the inventors choose to ignore lower case letters consisting of a lower loop 220.

Figure 33:
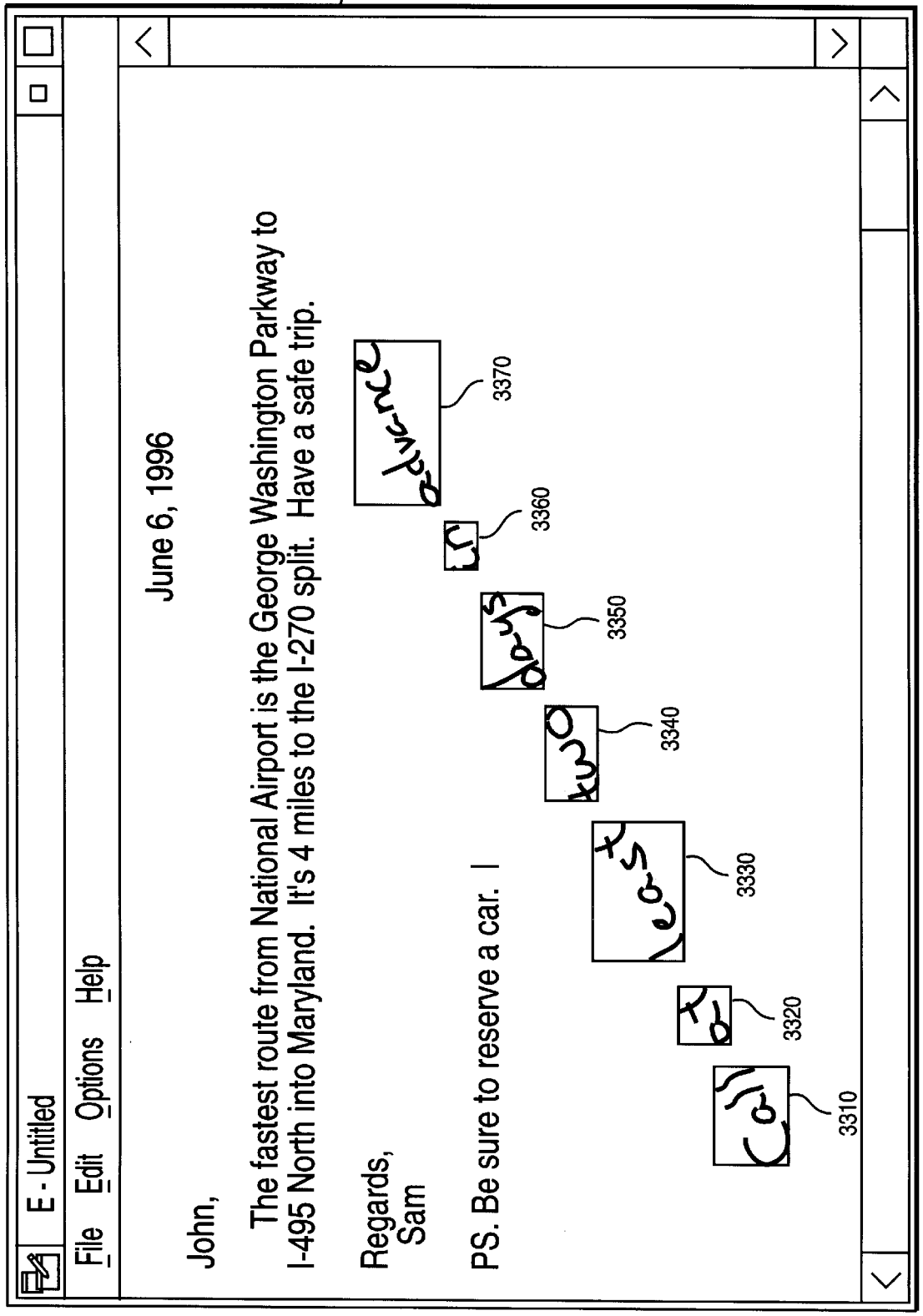
FIG. 33 shows an edit window with handwriting written at a steep angle.

The character recognition accuracy is not affected by slanted writing as shown in FIG. 33. Although the baseline is severely slanted, it is normalized by the recognition engine prior to character recognition. However, as depicted in FIG. 32 because the present invention relies on the bounding boxes drawn around the words to determine mean writing size, slanted handwriting must be discarded or handled separately because it distorts the apparent size of the bounding box. As shown in FIG. 33 bounding box 3370 typifies the distortion caused by writing 30 degrees off the horizontal. The amount of error introduced at 11.5 degrees from the horizontal is 2 percent so the invention uses 11.5 degrees as a cutoff for a valid baseline.

Figure 34A:
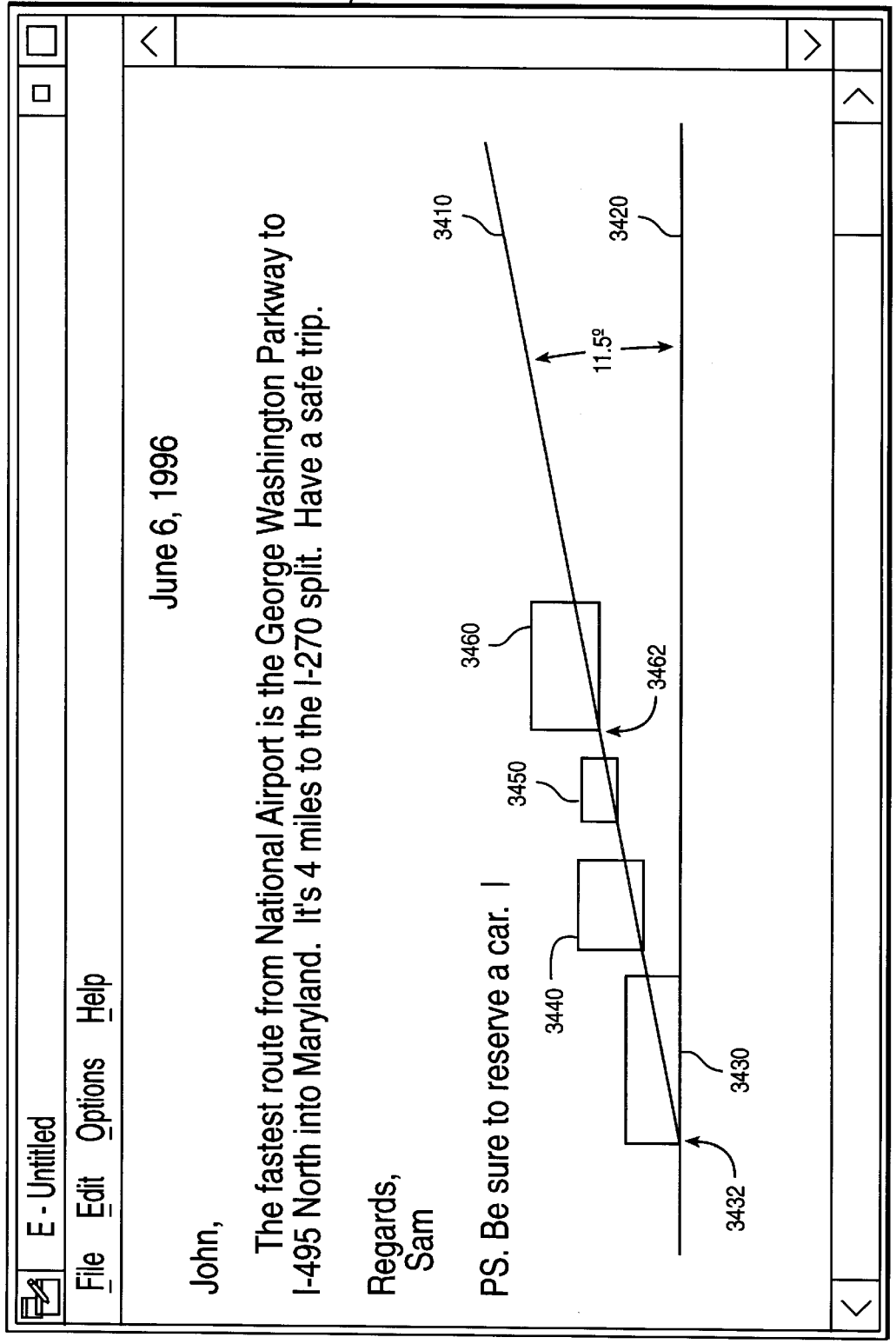
FIG. 34 shows an edit window with handwriting.
Figure 34B:
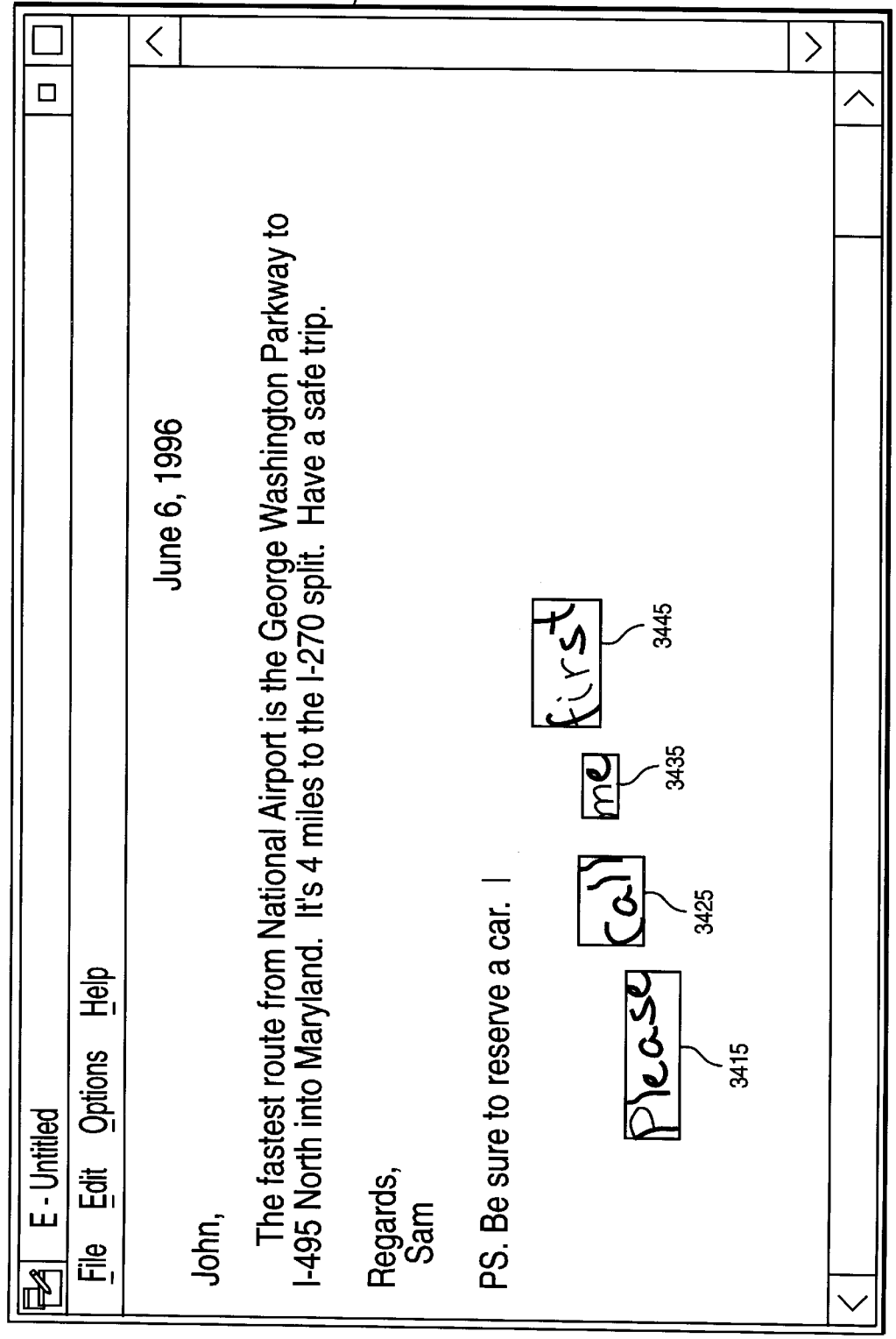

FIG. 34 illustrates the methodology for measuring baseline slant. A line is drawn through the approximate origin point of each word bounding box 3430, 3440, 3450 and 3460, whose text has been deleted for clarity, and the angle of this baseline line 3410 is computed. In one preferred embodiment, no slant greater than 11.5 degrees will be considered.

In an alternative embodiment, shown in FIG. 36, the mean size can still be computed by retrieving the low level character bounding boxes from the recognition engine. Character bounding boxes 3611, 3612, 3613 and 3614 will yield a much more accurate result than the associated word bounding box 3604.

The present embodiment does not consider this technique though because of the excessive amount of processing that would be consumed retrieving the numerous bounding boxes, applying the appropriate filters, and calculating the statistics.

Figure 35A:
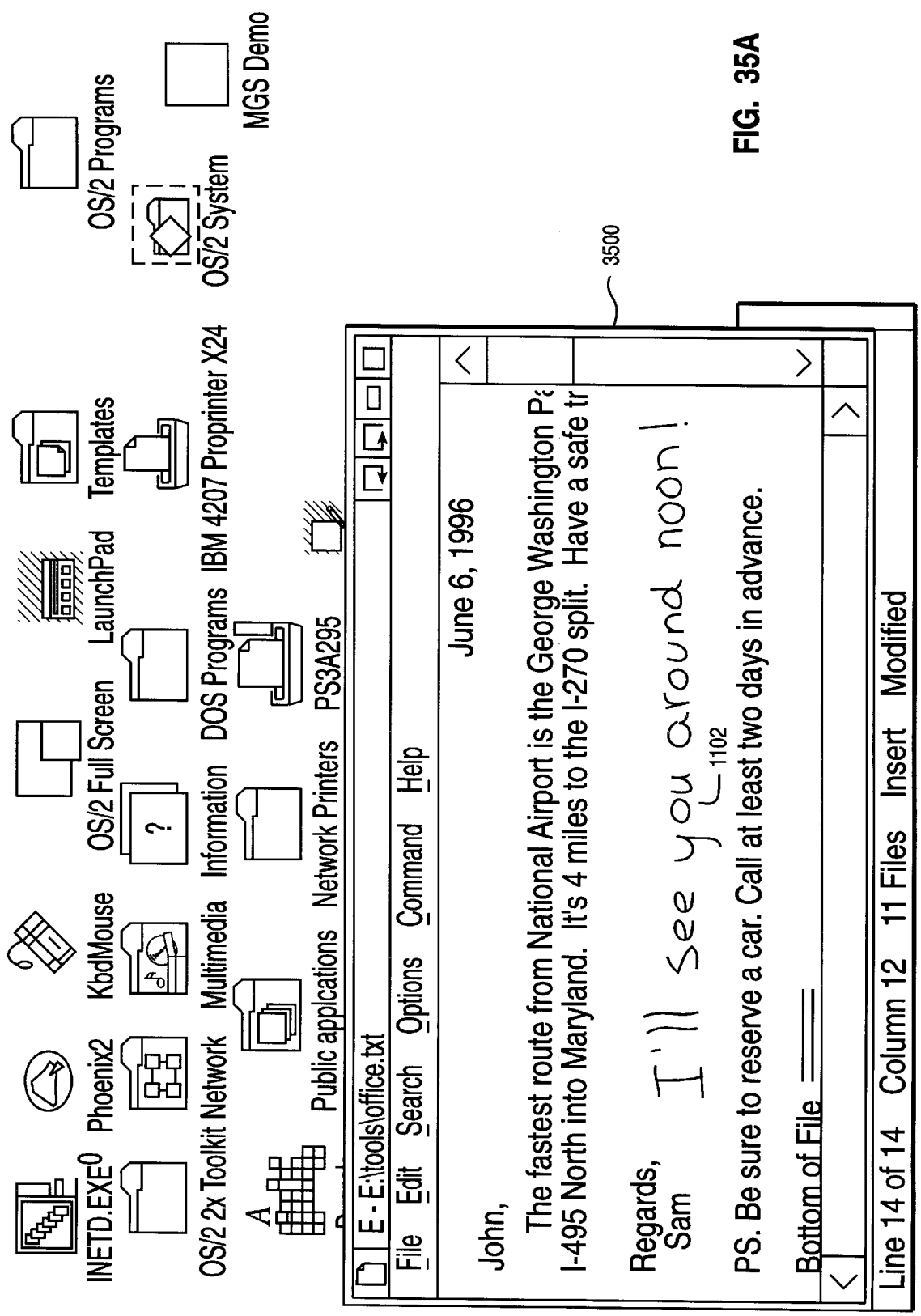
FIGS. 35A through 35C are series of windows showing handwriting input being incorrectly recognized, then corrected via a Edit Window dialog.
Figure 35B:
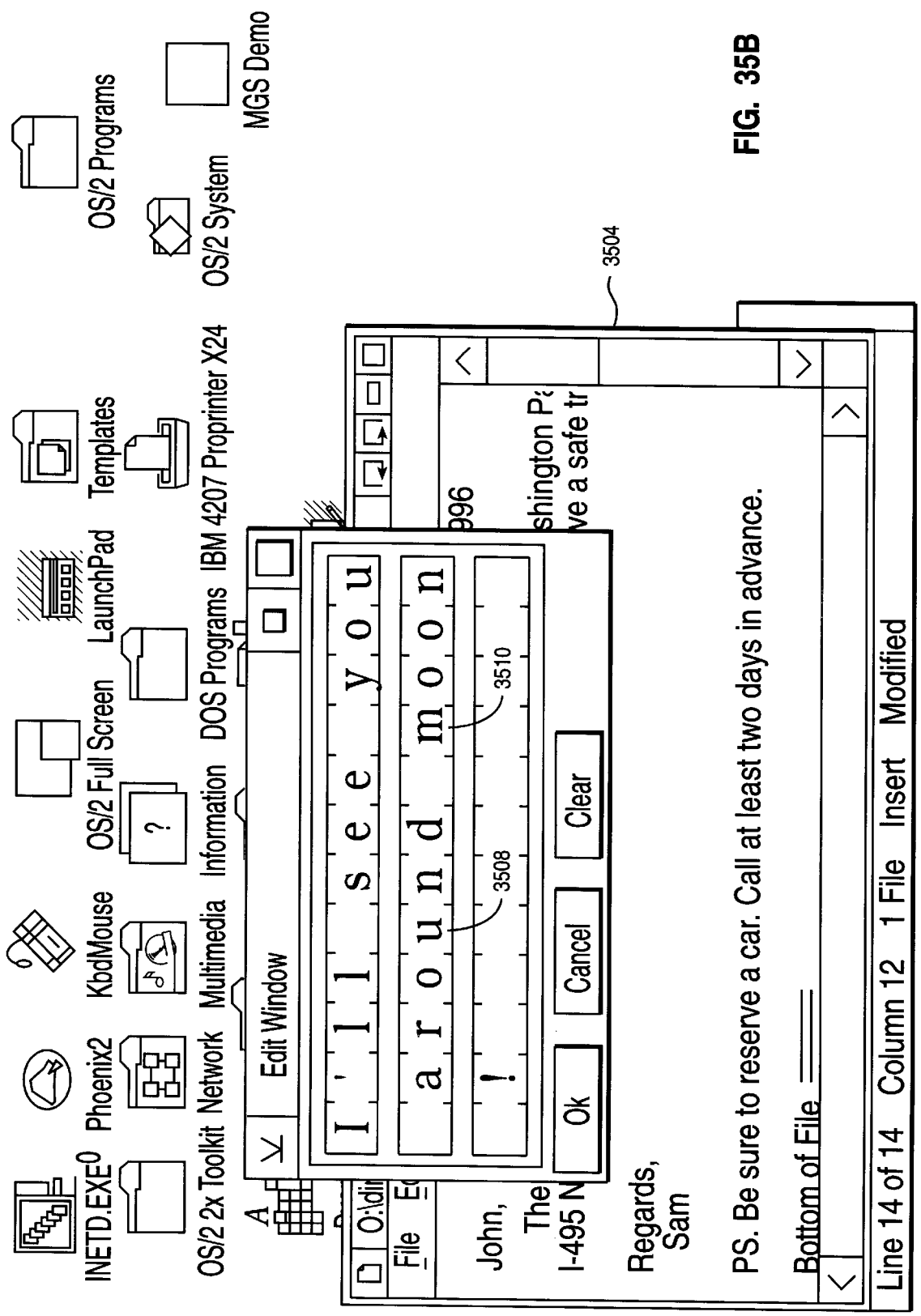
Figure 35C:
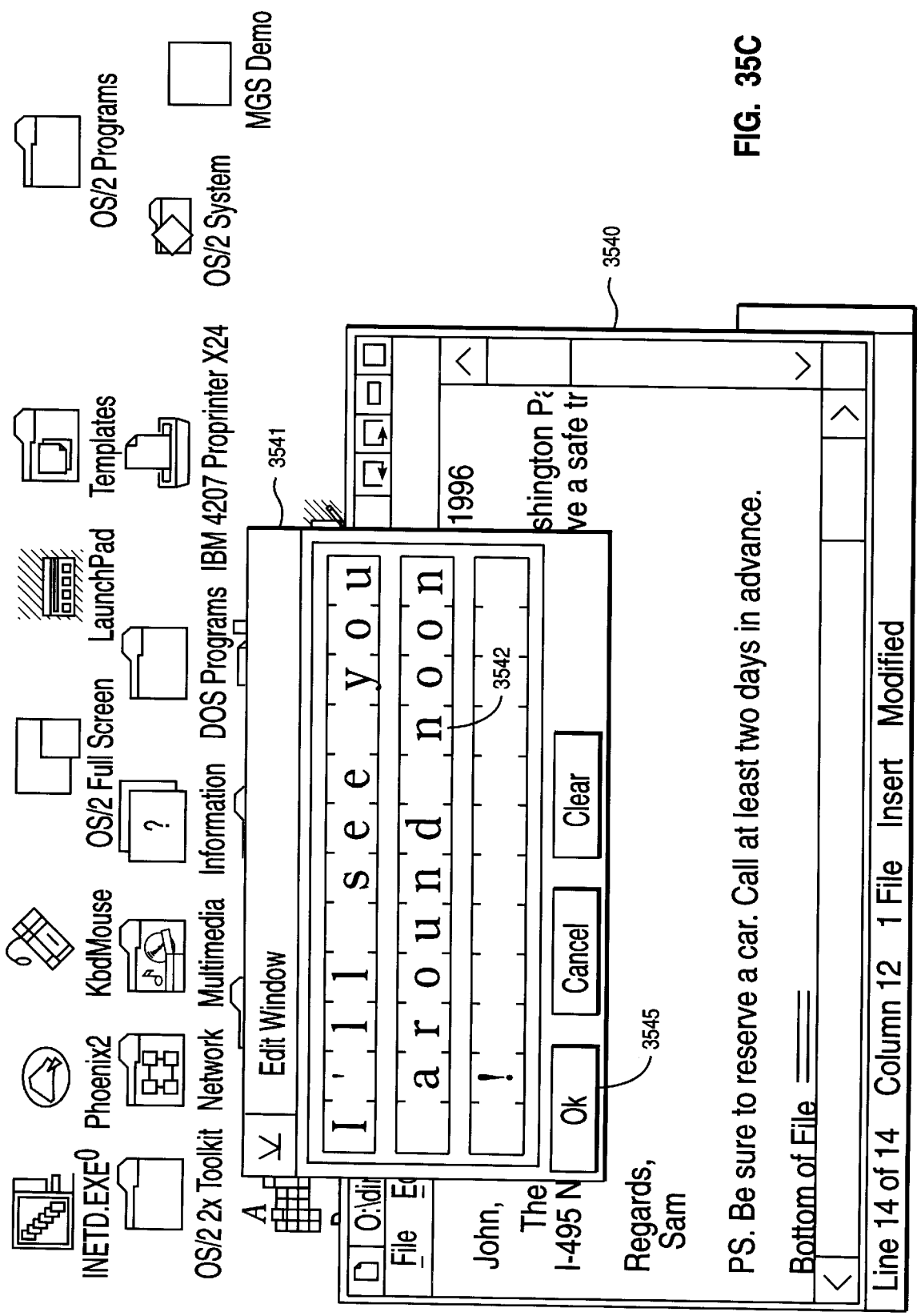

FIGS. 35A–35C give a sequence of events where corrected results are discarded. The user has entered handwriting input 3502 into an edit window 3500. The handwriting is recognized and displayed in a Edit Window 3506 to allow the user to confirm the recognized text 3508. The word 'moon' 3510 is a misspelling of the word 'noon' and the user writes an 'n' over the erroneous letter and Edit Window 3541 gets back the corrected letter 3542. When the user presses the OK button 1145, the text 3560 is sent to the application. Before routing the text to the application though, the invention invalidated the bounding box of the misspelled word and discarded it.

Figure 27:
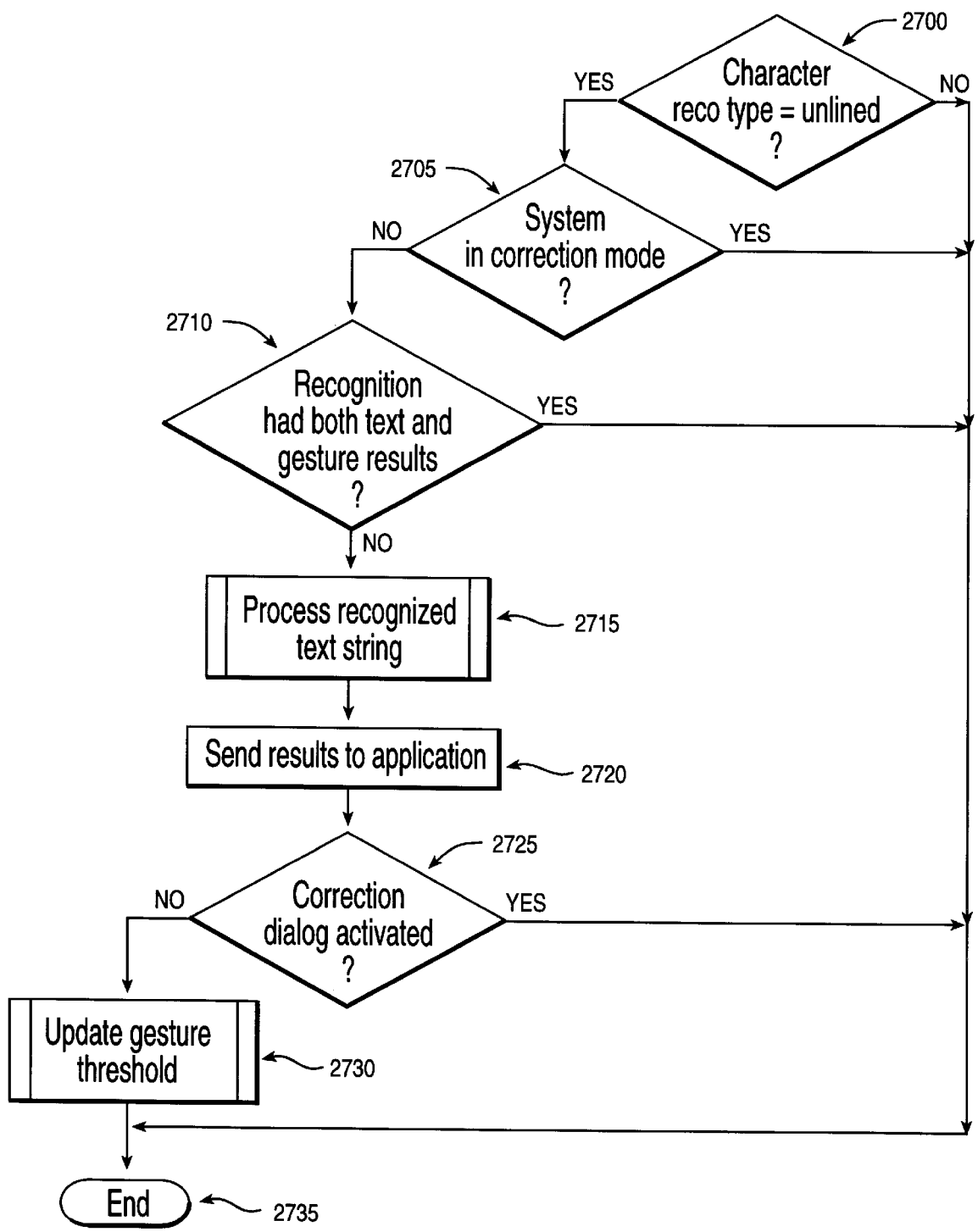

Referring now to FIG. 27, the logic flow of the preferred embodiment of the present invention may be examined in detail. This program logic receives control each time the Pen For OS/2 recognition engine has completed the recognition process on a collection of strokes. In step 2700, the type of character recognition is queried. The present invention is most effective when processing unlined handwriting and the routine ends in step 2735 if the recognition type is not unlined. Next, a test is made to determine if the system is in the process of correcting text, step 2705. Handwriting entered during correction sequences is often not representative of a user's normal handwriting so that input is also discarded. If the results from the recognition engine contained both a gesture and text, step 2710, it means that 5 or fewer strokes were collected which is unsuitable for averaging and the routine ends, step 2735. The text that passes the above filters is processed in step 2715 so that the average height may be calculated.

Figure 28:
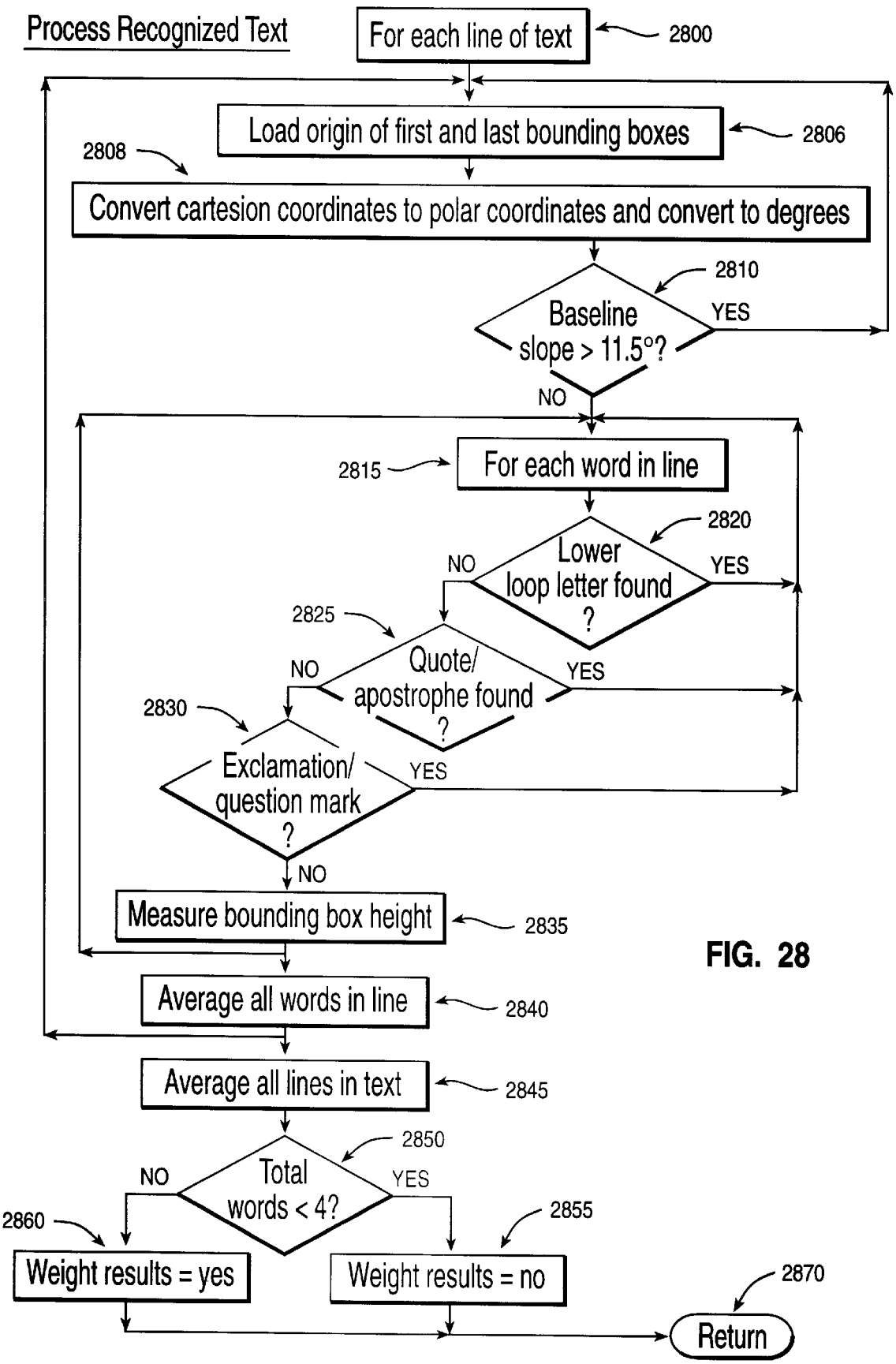

The text processing routine shown in FIG. 28, is comprised of an inner loop 2800 and an outer 2814 loop which sequentially process each word of a line and each line of the text respectively. In step 2805, the origin of the first and last bounding box of the line of text are queried. Then, in step 2808, executed by invoking common trigonometric library routines, the two Cartesian coordinates are converted to polar coordinates. The resultant vector is converted from radians to degrees off the horizontal. If the baseline for this particular line is within the slant parameter in step 2719, the inner loop is entered in step 2815, and three tests are conducted to filter out unsuitable words and symbols. Any word containing a lower case letter with a lower loop is tested in step 2820, any word containing a quote or apostrophe is tested in step 2825 or any exclamation point or question mark isolated in step 2830. Any of these conditions cause that particular bounding box to get rejected and the loop iterates, step 2815. If a word passes all three tests, the height of the bounding box is measured by subtracting yBottom from yTop in step 2835. The inner loop iterates through the line of text until each word has been processed. At step 2840, all valid bounding box heights are averaged together and the outer loop then iterates to the next line of text, step 2805. When the last line of text has been processed, the loop falls through to step 2845 where the all the line heights are averaged together. If the total number of valid words or bounding boxes is greater than 4, tested in step 2850, a flag is set to weight the results later when the gesture threshold gets updated. The results are not weighted, step 2855 if there are less than three words because the context of the handwriting is not clear. The routine returns in step 2870.

Referring to FIG. 27 after processing the recognized text to calculate the handwriting height, step 2715, the results are sent to the target application in step 2730. If the Edit Window is enabled for that application, it will be displayed before the application sees the text string and the test at step 2725 will be true. Since the recognized text may have had errors, the measured bounding boxes cannot be validated and the call to update the gesture threshold in step 2730 is bypassed. The process ends in step 2735.

Figure 29:
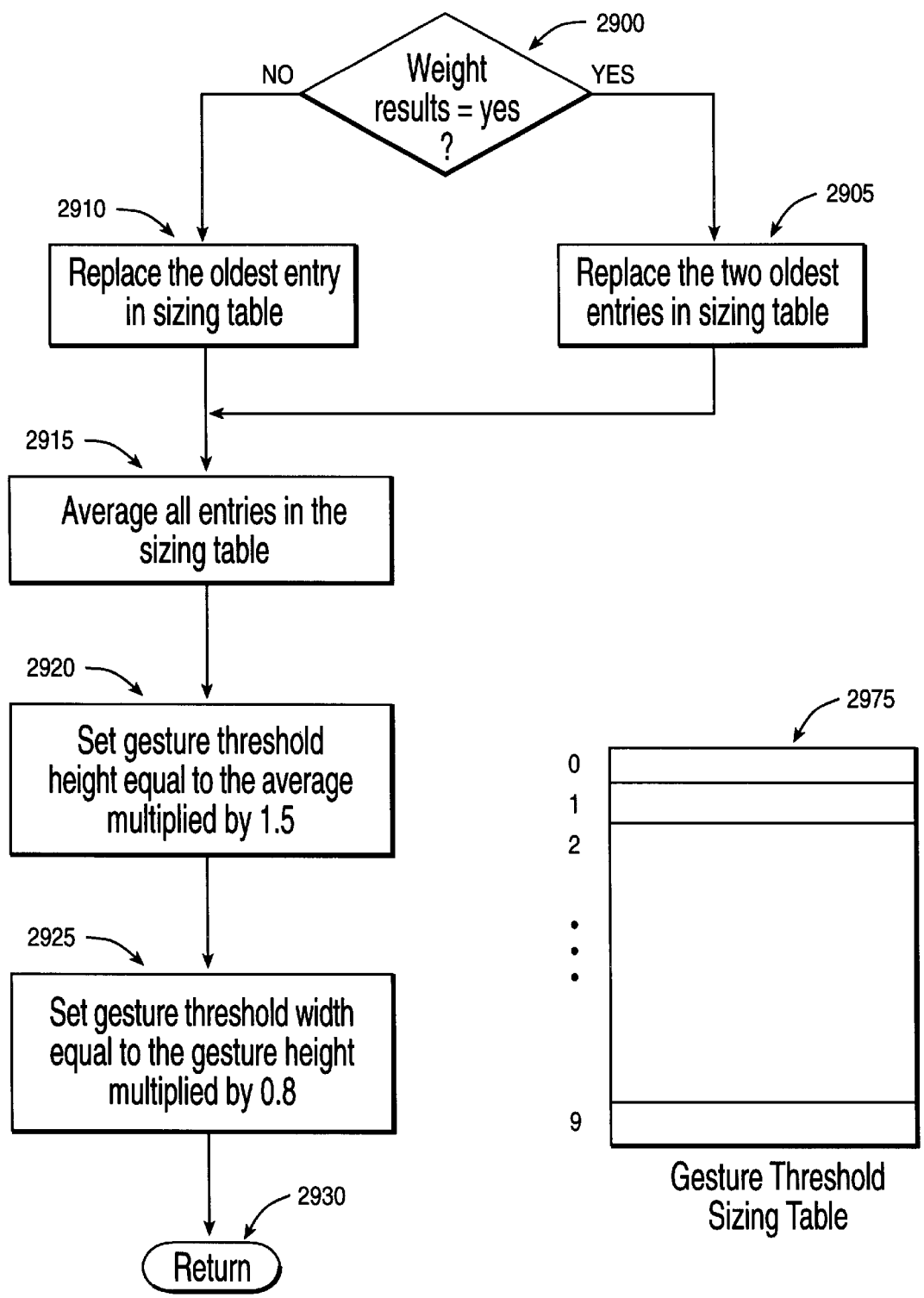

If no correction scenario took place, a subroutine is called to update the gesture threshold as shown FIG. 29. The present invention uses a sizing table 2975 containing 10 entries, each of which is a computed average height of a doodle or collection of strokes. If the newest sample is to be weighted in step 2900 the process it replaces the two oldest entries in the table. Otherwise, it just replaces the oldest entry. The process gives the smaller handwriting sample half the weight of the larger samples. All the entries in the table are then averaged in step 2915 and the gesture height is calculated by multiplying the result by 1.5 in step 2920. The X or gesture width value is then calculated by multiplying the height by 0.8 or 80% in step 2925. This new value is used immediately on the very next writing modality. The update routine then returns in step 2930 to the caller who then ends the current process.

Figure 30:
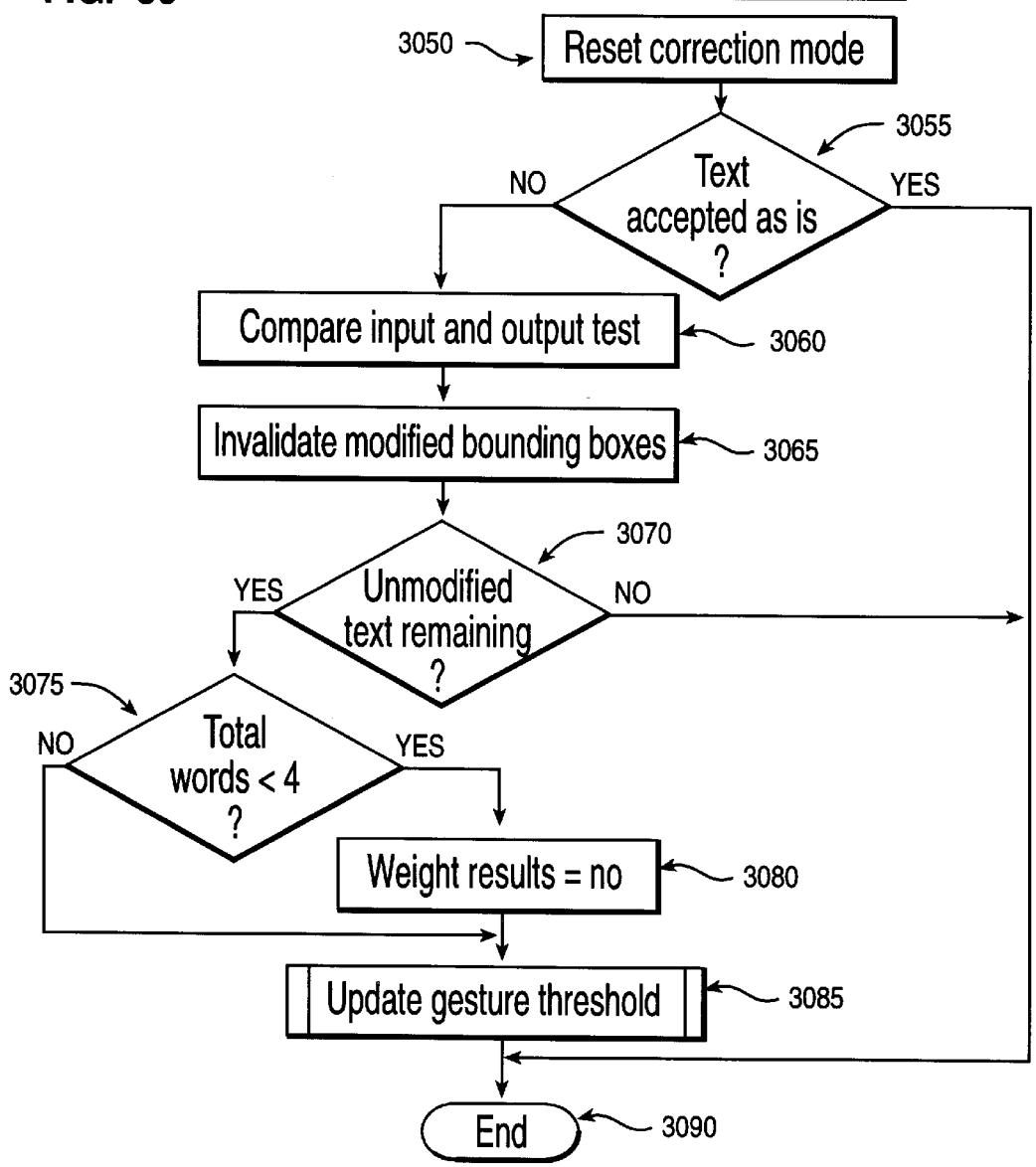

If an Edit Window had been created while sending the results to the target window, the routine in FIG. 30 Correction Dialog Activated, would have been invoked as part the window creation. At that time, the program would have set a system, flag, step 3000 to signal the beginning of a correction dialog and saved both the inputted text strings, step 3005 and the array of bounding boxes, step 3010, received for the recognition engine as part of the result. This is done so that the invention may determine what changes the user made to the recognized text.

When the user finally dismisses the Edit Window the invention again gets control and the system flag signalling the correction modality is reset in step 3050. If the user made no changes to the text, step 3055, the routine ends which allow the string to get passed to the application 1140. Otherwise, the output string is compared with the input string in step 3060 and each miscompare will cause the associated bounding box to be invalidated. After the string intact comparison is complete, the remaining text is compared to see if any of the original text survived intact, step 3070. If not, the process ends in step 3090. The total count is tested to see if it fell below 4 in step 3075 and if so, the weight flag is set to no in step 3080. The gesture threshold routine is then called in step 3085 and the process ends, step 3090.

Two addition processes pertinent to the present invention are shown in FIG. 31. The processes take control when the system first boots up and each time a new user requests that his/her gesture threshold be loaded. At boot time, the user's threshold is retrieved from a profile, step 3100. If it is found in step 3105, all entries in the sizing table are populated with it, step 3115. If the gesture threshold was not found, the system default gesture threshold is used 3110. The sizing table entries are population in step 3115. The process ends, step 3120.

As users request their gesture threshold be loaded, the system first queries if the current one should be saved under the current user's profile, step 3150. If so, it is saved in step 3155 and the new user's gesture threshold is retrieved from the profile in step 3160. If the gesture threshold is not found in the test in step 3165, again, the system default is used, step 3170 and the sizing table is initialized in step 3175 accordingly.

Although a specific embodiment has been disclosed, it will be understood by those skilled in the art that changes can be made to this specific embodiment without departing from the spirit and scope of the invention. Furthermore, this embodiment is for the purpose of example and illustration only and is not to be taken to limit the scope of the invention or narrow the scope of the appended claims.

We claim:

1. A method of distinguishing between handwriting and gesture input to a pen based computer system, comprising the steps of:

detecting a set of strokes input by a stylus to the computer system;

prior to recognition, sequentially analyzing the set of strokes for either a first set of characteristics indicative of a handwriting input or a second set of characteristics indicative of a gesture input;

prior to recognition, after analyzing each stroke, for either the first or the second set of characteristics of all analyzed strokes, categorizing the set of strokes as gesture or handwriting input; and based on whether the set of strokes is categorized as gesture or handwriting input, Performing gesture recognition or handwriting recognition on the set of strokes to recognize the set of strokes as a particular gesture or handwriting.

2. The method as recited in claim 1 wherein categorizing step further comprises the step of categorizing the set of strokes as unknown input.

3. The method as recited in claim 1 wherein the categorizing step further comprises the step of after a predetermined number of strokes, categorizing the stroke as handwriting input.

4. The method as recited in claim 1 the categorizing step further comprises the step of responsive to a last analyzed stroke of a predetermined type, categorizing the set of strokes as gesture input.

5. The method as recited in claim 4 wherein the predetermined type of stroke is a tap stroke.

6. The method as recited in claim 1 wherein responsive to categorizing the set of strokes as handwriting input, the set of strokes is sent for handwriting recognition only.

7. The method as recited in claim 1 wherein responsive to categorizing the set of strokes as gesture input, the set of strokes is sent for gesture and handwriting recognition.

8. The method as recited in claim 7 further comprising the steps of:

building a results data structure containing a recognized gesture as a primary result and a recognized text character as a secondary result; and sending the results data structure to a target application for further processing.

9. The method as recited in claim 1 wherein the categorizing step further comprises the step of testing for a window setting for a type of input accepted for a window in which the set of strokes were input for a type of input accepted setting.

10. The method as recited in claim 1 wherein the categorizing step further comprises the steps of:

analyzing a separation distance between strokes; and responsive to a determination that the separation distance exceeds a predetermined distance, categorizing the set of strokes as handwriting input.

11. The method as recited in claim 10 wherein the separation distance between strokes is analyzed in the horizontal direction only.

12. The method as recited in claim 1 wherein the analyzed step further comprises the step of analyzing each stroke for size.

13. The method as recited in claim 12 wherein the categorizing step further comprises the step of categorizing the set of strokes as gesture input if all analyzed strokes are larger than a predetermined size.

14. The method as recited in claim 1 wherein the categorizing step further comprises the step of categorizing the set of strokes as handwriting or gesture input based on an elapsed time during which the set of strokes are input.

15. The method as recited in claim 1 wherein the categorizing step further comprises the steps of:

counting a total number of analyzed strokes; and counting a number of analyzed strokes which exceed a predetermined size.

16. A system including processor, memory, display and, pen input device for distinguishing between handwriting and gesture input, comprising:

a handwriting recognition engine for recognizing pen input as handwriting input;

a gesture recognition engine for recognizing pen input as gesture input;

means for detecting a set of strokes input by a stylus to the computer system;

means for sequentially analyzing the set of strokes for a first or a second set of characteristics respectively indicative of a handwriting input or a gesture input prior to recognition;

means responsive to analyzing each stroke for either the first or the second set of characteristics of all analyzed strokes for categorizing the set of strokes as gesture or handwriting input prior to recognition; and means for sending the set of strokes to one or both of the handwriting recognition engine or the gesture recognition engine for recognizing the set of strokes as a particular handwriting or gesture on the basis of the categorization.

17. The system as recited in claim 16 wherein the categorizing means further comprises means for categorizing the stroke as handwriting input after a predetermined number of strokes.

18. The system as recited in claim 16 wherein the categorizing means further comprises means responsive to a last analyzed stroke of a predetermined type for categorizing the set of strokes as gesture input.

19. The system as recited in claim 16 wherein responsive to categorizing the set of strokes as gesture input the set of strokes is sent to the gesture recognition engine.

20. The system as recited in claim 16 wherein the categorizing means further comprises means for testing for a window for a type of input accepted setting for a window in which the set of strokes were input.

21. The system as recited in claim 16 wherein the categorizing means further comprises:

means for analyzing a separation distance between strokes; and means responsive to a determination that the separation distance exceeds a predetermined distance for categorizing the set of strokes as handwriting input.

22. The system as recited in claim 16 wherein the analyzed means further comprises means for analyzing each stroke for size.

23. The system as recited in claim 16 wherein the categorizing means further comprises means for categorizing the set of strokes as handwriting or gesture input based on an elapsed time during which the set of strokes are input.

24. A computer program product in a computer readable memory for distinguishing between handwriting and gesture input to a computer comprising:

means for detecting a set of strokes input by a stylus to the computer system;

means for sequentially analyzing each of the strokes either for a first set of characteristics indicative of a handwriting input or a second set of chracteristics indicative a gesture input prior to recognition;

means for categorizing the set of strokes as gesture or handwriting input for either the first or the second set of characteristics of all analyzed strokes and prior to recognition; and means responsive to categorization of the set of strokes as gesture or handwriting input for performing gesture recognition or handwriting recognition on the set of strokes to recognize the set of strokes as a particular gesture or handwriting.

25. The product as recited in claim 24 wherein the categorizing means further comprises means for categorizing the stroke as handwriting after a predetermined number of strokes are input.

26. The product recited in claim 24 the categorizing means further comprises means responsive to a last analyzed stroke of a predetermined type for categorizing the set of strokes as gesture input.

27. The product as recited in claim 24 responsive to categorizing the set of strokes as gesture input the set of strokes is sent for gesture recognition.

28. The product as recited in claim 24 wherein the categorizing means further comprises means for testing for a window setting for a window for a type of input accepted in which the set of strokes were input.

29. The product as recited in claim 24 wherein the categorizing step further comprises:

means for analyzing a separation distance between strokes; and means responsive to a determination that the separation distance exceeds a predetermined distance for categorizing the set of strokes as handwriting input.

30. The product as recited in claim 24 wherein the analyzed means further comprises means for analyzing each stroke for size.

31. The product as recited in claim 24 wherein the categorizing means further comprises means for categorizing the set of strokes as handwriting or gesture input, based on an elapsed time during which the set of strokes are input.

* * * * *